United States Patent
Nagao

(10) Patent No.: US 8,706,922 B2
(45) Date of Patent: Apr. 22, 2014

(54) INFORMATION PROCESSING APPARATUS, KVM SWITCH, SERVER, AND COMPUTER READABLE MEDIUM

(75) Inventor: Naoyuki Nagao, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 1387 days.

(21) Appl. No.: 12/222,730

(22) Filed: Aug. 14, 2008

(65) Prior Publication Data

US 2009/0058804 A1 Mar. 5, 2009

(30) Foreign Application Priority Data

Aug. 29, 2007 (JP) ................. 2007-222925

(51) Int. Cl.
*G06F 3/00* (2006.01)
*G06F 3/14* (2006.01)

(52) U.S. Cl.
USPC .......................................... 710/19; 709/219

(58) Field of Classification Search
USPC .......................................................... 710/19
See application file for complete search history.

(56) References Cited

U.S. PATENT DOCUMENTS

| | | | |
|---|---|---|---|
| 5,379,409 A | 1/1995 | Ishikawa | |
| 6,072,463 A | 6/2000 | Glaser | |
| 6,115,027 A * | 9/2000 | Hao et al. | 715/858 |
| 7,590,763 B2 * | 9/2009 | Thomas et al. | 710/2 |
| 7,747,702 B2 * | 6/2010 | Anderson et al. | 709/219 |
| 2003/0217123 A1 | 11/2003 | Anderson et al. | |
| 2004/0215743 A1 * | 10/2004 | Cook et al. | 709/217 |
| 2005/0007344 A1 * | 1/2005 | Cook et al. | 345/163 |
| 2005/0044184 A1 | 2/2005 | Thomas et al. | |
| 2007/0050470 A1 | 3/2007 | Suzuki et al. | |
| 2007/0257883 A1 * | 11/2007 | Ke | 345/157 |

FOREIGN PATENT DOCUMENTS

| | | |
|---|---|---|
| JP | 3276342 | 12/1991 |
| JP | 5-289843 | 11/1993 |
| JP | 6-75695 | 3/1994 |
| JP | 6075695 | 3/1994 |
| JP | 7-200472 | 8/1995 |
| JP | 2002-525750 | 8/2002 |
| JP | 2003-534685 | 11/2003 |
| JP | 2006197299 | 7/2006 |
| JP | 2007065944 | 3/2007 |
| WO | 01/84291 | 11/2001 |

OTHER PUBLICATIONS

Japanese Patent Office Action dated Apr. 17, 2012 in Application No. 2007-222925.

(Continued)

*Primary Examiner* — Titus Wong
(74) *Attorney, Agent, or Firm* — Staas & Halsey LLP

(57) ABSTRACT

An information processing apparatus comprises an inputting portion, a detecting portion, and an outputting portion. The inputting portion inputs operation data from an operating member. The detecting portion detects a single piece of or a plurality pieces of operation data such that an amount of movement of a cursor of the information processing apparatus and an amount of movement of a cursor of a server coincide with each other, based on a corresponding relationship between the operation data, the amount of movement of the cursor of the information processing apparatus displayed on a screen of the information processing apparatus, and the amount of movement of the cursor of the server displayed on a window provided in the screen of the information processing apparatus, and the operation data input by the inputting portion. The outputting portion outputs the single piece of or the plurality pieces of operation data to the server.

23 Claims, 22 Drawing Sheets

(56) References Cited

OTHER PUBLICATIONS

Extended European Search Report dated Dec. 1, 2009 and issued in corresponding European Patent Application 08163219.2.

Extended European Search Report dated Nov. 25, 2009 and issued in corresponding European Patent Application 08163220.0.

Extended European Search Report dated Nov. 25, 2009 and issued in corresponding European Patent Application 08163221.8.

* cited by examiner

FIG. 7A

| X | 1.0 | 2.0 | 3.0 | 4.0 | 5.0 | 6.0 | 7.0 | 8.0 | 9.0 | 10.0 | 11.0 | 12.0 |
|---|---|---|---|---|---|---|---|---|---|---|---|---|
| Y | 0.5 | 1.0 | 2.2 | 3.4 | 4.5 | 5.7 | 6.9 | 8.0 | 9.8 | 12.0 | 14.2 | 16.4 |
| Z | 1.0 | 2.0 | 3.8 | 5.5 | 7.3 | 9.0 | 14.0 | 19.0 | — | — | — | — |

FIG. 7B

| X | 1 | 2 | 3 | 4 | 5 | 6 | 7 | 8 | 9 | 10 | 11 | 12 |
|---|---|---|---|---|---|---|---|---|---|---|---|---|
| Y | 1 | 1 | 2 | 3 | 5 | 6 | 7 | 8 | 10 | 12 | 14 | 16 |
| Z | 1 | 2 | 4 | 6 | 7 | 9 | 14 | 19 | — | — | — | — |

FIG. 7C

| Y | 1 | 1 | 2 | 3 | 5 | 6 | 7 | 8 | 10 | 12 | 14 | 16 |
|---|---|---|---|---|---|---|---|---|---|---|---|---|
| X−1 | 1 | 1 | 2 | 2 | 3 | 4 | 5 | 5 | 6 | 4 | 7 | 7 |
| X−2 |   |   |   | 1 | 1 |   |   | 1 | 1 | 4 |   | 2 |
| Z−1 | 1 | 1 | 2 | 2 | 4 | 6 | 7 | 7 | 9 | 6 | 14 | 14 |
| Z−2 |   |   |   | 1 | 1 |   |   | 1 | 1 | 6 |   | 2 |

INFORMATION PROCESSING APPARATUS, KVM SWITCH, SERVER, AND COMPUTER READABLE MEDIUM

BACKGROUND OF THE INVENTION

1. Field of the Invention

The present invention relates to an information processing apparatus, a KVM switch, a server, and a computer readable medium which make the position of a mouse cursor of the information processing apparatus and the position of a mouse cursor of the server coincide with each other.

2. Description of the Related Art

Up to now, various techniques have been developed as for the means to operate a computer remotely. In a remote operation, two computers on an operated side (a server) and an operating side (a remote PC) are necessary.

For example, there have been known a system which displays both of screen information of a remote terminal and information of a terminal in hand without damaging operability and visibility of a screen displayed on a display of the terminal in the hand (see Japanese Laid-Open Patent Publication No. 2007-65944), a cursor controlling apparatus by which an amount of cursor movement to an amount of movement of a remote control transmitter becomes constant even if the distance between the remote control transmitter and an image pickup means is different (see Japanese Laid-Open Patent Publication No. 06-75695), and a system which remote-controls a computer from a portable phone by connecting the portable phone to the remote computer (see Japanese Laid-Open Patent Publication No. 2006-197299).

Further, there has been known a technique that software for remote control is not installed in a server, a converter is disposed at a connecting route between the server and a remote PC, and the converter acts for a keyboard and a mouse connected to the server (see Japanese Patent No. 2698685).

In the technique, signals output from the keyboard and the mouse connected to the remote PC are converted into digital data, and the digital data is transferred on a line. The server receives the digital data to restore it to the signals, and inputs the signals thereto. Therefore, the server operates so that the keyboard and the mouse are directly connected to the server. Further, a video signal output from the server is converted into digital data, and the converted digital data is transferred on a line. The remote PC receives the converted digital data to restore it to the video signal, and inputs the video signal thereto. Therefore, a monitor set up on the side of the remote PC operates so as to be a monitor connected to the server.

For example, there has been known a system including a KVM switch in Patent Application Publication No. 2003-534685, as another technique to which these technique are applied.

The system of Patent Application Publication No. 2003-534685 has a basic concept of Japanese Patent No. 2698685. In a window system that the remote PC has, a window is assumed to be a display means, and the window is assumed to be an input route of keyboard and mouse data. That is, the operations of the keyboard and the mouse executed in the window of the remote PC are reflected in the server.

(Problem 1)

In the above-mentioned technique of Patent Application Publication No. 2003-534685, the window that the remote PC has is displayed as shown in FIG. 19, for example. In this case, although two mouse cursors including a mouse cursor for the remote PC (hereinafter referred to as "a remote mouse cursor") to operate the window of the remote PC, and a mouse cursor for server (hereinafter referred to as "a server mouse cursor") which is displayed inside the window of the remote PC exist, there is the case where a position of the remote mouse cursor displayed by the remote PC and a position of the server mouse cursor displayed by the remote PC do not coincide with each other. This is referred to as a position gap, and there has been known a method to correct and handle the position gap with a position gap correcting function. However, there is the following problem in this.

Generally, in the window system, there is an acceleration process of the mouse cursor, and the server multiplies data output from the mouse by an acceleration factor to increase or reduce the mouse data. Therefore, when the mouse data operated with the remote PC is directly transmitted to the server, the server multiplies the mouse data from the remote PC by the acceleration factor to increase or reduce the mouse data. Accordingly, the remote mouse cursor displayed on the remote PC and the server mouse cursor displayed on the remote PC hardly overlap with each other. At this time, an operator of the remote PC is puzzled by the two cursors that do different movements, an accurate mouse operation is prevented, and hence the operator feels stress.

Therefore, it was basic to invalidate this acceleration process at the expense of operability so far.

To properly execute the position gap correcting function by the remote PC, it is necessary to prohibit this acceleration process. The position gap correcting function represents a means to move the position of the mouse cursor of the server to the position of the mouse cursor of the remote PC compulsorily by additionally outputting the mouse data from the remote PC to the server so as to cancel an amount of the position gap when the position gap between the mouse cursors of the server and the remote PC occurs. At this time, the mouse data additionally output from the remote PC to the server often exceeds a reference value, i.e., a threshold whether the acceleration process starts. Therefore, when the acceleration process is effective in the server, the mouse cursor of the server moves so that an amount of the movement of the mouse cursor of the server exceeds the amount of the position gap that should be actually moved. As a result, the position gap correcting function is not properly executed.

Thus, conventionally, when the acceleration process executed by the server has not been invalidated, the position gap between the mouse cursors of the server and the remote PC could not be corrected, so that it has been impossible to provide a comfortable mouse operating environment for the operator of the mouse of the remote PC.

Although a description is given of the case where the acceleration process of the server has to be invalidated to make the position gap correcting function effective, this acceleration process cannot be easily invalidated depending on a windowing system or a operating system. As for this, a X-window system used by the UNIX (a registered trademark) system OS is representative. As for an example which can invalidate acceleration process easily, Windows (a registered trademark) of Microsoft company is cited.

(Problem 2)

Not to give the operator of the remote PC embarrassment, there has been known a technique which controls the remote PC so that, on the window that displays the mouse cursor of the server, the remote mouse cursor of the remote PC is not displayed, and only the movement of the mouse cursor of the server is displayed even if the mouse of the remote PC is operated. However, in the technique, the following problem occurs.

Generally, in the window system, the mouse cursor is configured such that a window right under the mouse cursor is operated, and the authority of display and non-display of the mouse cursor is given to the window right under the mouse cursor. Therefore, the mouse cursor of the remote PC can be made to non-display only when the mouse cursor of the remote PC is directly above the window where non-display of the mouse cursor has been set.

That is, at the instant when the mouse cursor exceeds the frame of the window, the mouse cursor of the remote PC is displayed again assuming that any one of other window is operated. Further, when the mouse cursor comes again directly above the window where non-display of the mouse cursor has been set, the mouse cursor of the remote PC is not displayed.

Here, a description will now be given of the meaning of the data output from the mouse (i.e., the mouse data), which becomes the prime cause of the problem. Up to the present date after the mouse is invented, the data output from the mouse (the mouse data) is represented by relative coordinates. The relative coordinates are called the amount of the movement. By using this, it can be expressed that the mouse moves N in the X-axis direction, and M in the Y-axis direction, for example. Original values of the N and M are calculated by the mouse, and the calculation method thereof is a well-known technique.

When the mouse cursor of the remote PC, which has exceeded the frame of the window and has been displayed once, moves again directly above the window where non-display of the mouse cursor has been set, the mouse cursor of the remote PC becomes non-display. At this time, the following problem occurs from the convenience of the process of the relative coordinates mentioned above. This is explained with FIG. 20.

FIG. 20 is a diagram showing an example of a screen of the conventional remote PC.

In FIG. 20, reference numeral 201 denotes a window where non-display of the mouse cursor has been set, reference numeral 202 denotes another window where display of the mouse cursor has been set, and reference numeral 203 denotes a screen of the remote PC. Reference numeral 204 denotes the mouse cursor of the server, and reference numeral 205 denotes the mouse cursor of the remote PC. A screen of the server is displayed on a window 201.

The mouse cursor 204 of the server is at a position "a" in an initial state, and the mouse cursor 205 of the remote PC is at a position "A" in the initial state.

The mouse cursor 204 of the server moves in response to the movement of the mouse cursor 205 of the remote PC. At this time, when the mouse cursor 205 of the remote PC is directly above the window 201, the mouse cursor 205 of the remote PC is not displayed. That is, when the mouse cursor 205 of the remote PC is at the position "A", "F", or "G", it becomes non-display.

Next, when the mouse cursor 205 of the remote PC moves from the position "A" to a position "B", the mouse cursor 204 of the server moves from the position "a" to a position "b" in response to the movement of the mouse cursor 205 of the remote PC. The position "B" is a verge of the frame of window 201. At the instant when the mouse cursor 205 of the remote PC exceeds the position "B", the mouse cursor 205 of the remote PC is displayed.

Next, when the mouse cursor 205 of the remote PC moves from the position "B" to a position "C", and further to a position "D", the mouse cursor 204 of the server does not move from the position "b". When the mouse cursor 205 of the remote PC exceeds the position "D" and moves to the position "F", the mouse cursor 205 of the remote PC becomes non-display, and the mouse cursor 204 of the server moves from the position "b" to a position "f".

On the other hand, when the mouse cursor 205 of the remote PC moves from the position "B" to a position "C", and further to a position "E", the mouse cursor 204 of the server does not move from the position "b". When the mouse cursor 205 of the remote PC exceeds the position "E" and moves to the position "G", the mouse cursor 205 of the remote PC becomes non-display, and the mouse cursor 204 of the server moves from the position "b" to a position "g".

Then, when the mouse cursor 204 of the server is moved from the position "g" to a position "h", the mouse cursor 205 of the remote PC which is non-display can be moved from the position "G" to a position "H". However, when the mouse cursor 204 of the server is moved from the position "f" to the position "h", the mouse cursor 205 of the remote PC exceeds the frame of the window 201 before the mouse cursor 204 of the server reaches the position "h", and hence it is impossible to move the mouse cursor 204 from the position "f" to the position "h".

Thus, when the mouse cursor 205 of the remote PC is set to non-display in the window displaying the mouse cursor 204 of the server, it is impossible to provide a comfortable mouse operating environment for the operator of the mouse of the remote PC by the position gap between the mouse cursor 204 of the server and the mouse cursor 205 of the remote PC.

(Problem 3)

A description will now be given of the case where a problem similar to the problem 2 occurs.

When the screen of the server is operated from remote PC, a single operator does not necessarily operate it. That is, the screen of the server may be operated in the local besides the remote PC. The local represents an environment in which a keyboard, a mouse, and a monitor are directly connected to the server, and the screen of the server is operated.

FIG. 21A is a diagram showing an example of the screen of the conventional local, and FIG. 21B is a diagram showing an example of the screen of the conventional remote.

In FIGS. 21A and 21B, reference numeral 201 denotes a window where non-display of the mouse cursor has been set, reference numeral 202 denotes another window where display of the mouse cursor has been set, and reference numeral 203 denotes a screen of the remote PC. Reference numeral 204 denotes the mouse cursor of the server, reference numeral 205 denotes the mouse cursor of the remote PC. Reference numeral 206 denotes a screen of the local (i.e., a screen of the server). The screen of the server is displayed on a window 201.

A description will now be given of an example of the case where, first, the screen of the server is operated by the local side, the mouse cursor 204 of the server is moved from a position "a" to a position "b" or "c", and then the mouse cursor 205 of the remote PC is operated.

When the mouse cursor 204 of the server is moved from the position "a" to the position "c", and then the mouse cursor 204 of the server is moved from the position "c" to a position "d" by the operation of the mouse cursor 205 of the remote PC, an operator of the remote PC does not understand where the mouse cursor 205 of the remote PC exists at that time. For example, when the mouse cursor 205 of the remote PC is any one of at the positions "A", "B", and "C", it is required that the operator of the remote PC moves the mouse cursor 205 of the remote PC in the direction of "Vcd". In this example, even when the mouse cursor 205 of the remote PC is any one of at the positions "A", "B", and "C", the mouse cursor 204 of the server can be moved to the position "d" without problems.

When the mouse cursor 204 of the server is moved from the position "a" to the position "c", and then the mouse cursor 204 of the server is moved from the position "c" to the position "d" by the operation of the mouse cursor 205 of the remote PC, the problems never occur if the mouse cursor 205 of the remote PC is at the position "A". However, when the mouse cursor 205 of the remote PC is at the position "B" or "C", the mouse cursor 205 of the remote PC exceeds the frame of the window 201 before the mouse cursor 204 of the server is moved to the position "d", and hence it is impossible to move the mouse cursor 204 of the server to the position "d".

Thus, when the remote side and the local side alternately move the mouse cursor 204 of the server, it is impossible to provide a comfortable mouse operating environment for the operator of the mouse of the remote PC by the position gap between the mouse cursor 204 of the server and the mouse cursor 205 of the remote PC.

(Problem 4)

A description will now be given of an issue of the case where the mouse cursor 205 of the remote PC once goes out of the inside of the window 201 to the outside thereof, and goes into the inside of the window 201 from the outside thereof again.

FIG. 22 is a diagram showing an example of the screen of the conventional remote PC.

In FIG. 22, reference numeral 201 denotes a window where non-display of the mouse cursor has been set, reference numeral 202 denotes another window where display of the mouse cursor has been set, and reference numeral 203 denotes a screen of the remote PC. Reference numeral 204 denotes the mouse cursor of the server, reference numeral 205 denotes the mouse cursor of the remote PC.

In an initial state, the mouse cursor 204 of the server is at a position "a", and the mouse cursor 205 of the remote PC is at a position "A" which is the same position as the position "a". When the mouse cursor 205 of the remote PC is moved from the position "A" to a position "B'", the mouse cursor 204 of the server is moved from the position "a" to a position "b". The position "B'" and the position "b" are the same as each other.

Next, when the mouse cursor 205 of the remote PC exceeds the frame of the window 201, the mouse cursor 204 of the server stays without moving from the position "b".

When the mouse cursor 205 of remote PC traces a route C, is moved from the position B to a position G, exceeds the frame of the window 201, reaches a position "H", and is moved to a position "I", the mouse cursor 204 of the server is moved from the position "b" to a position "i'".

Here, when the operator of the remote PC manually sets the position gab correcting function to ON, and moves forcibly the mouse cursor 204 of the server from the position "i'" to the position "i", there no position gap between the mouse cursor 204 of the server and the mouse cursor 205 of the remote PC, and hence the operator of the remote PC can accurately operate the mouse cursor 204 and the mouse cursor 205.

Thus, in the case where the mouse cursor 205 of the remote PC once goes out of the inside of the window 201 to the outside thereof, and goes into the inside of the window 201 from the outside thereof again, it is impossible to provide a comfortable mouse operating environment for the operator of the mouse of the remote PC by the position gap between the mouse cursor 204 of the server and the mouse cursor 205 of the remote PC as long as the position gap correcting function is not executed.

SUMMARY OF THE INVENTION

It is an object of the present invention to provide an information processing apparatus, a KVM switch, a server, and a computer readable medium which are capable of providing a comfortable operating environment of an operating member for an operator of the information processing apparatus.

According to a first aspect of the present invention, there is provided an information processing apparatus comprising: an inputting portion that inputs operation data from an operating member; a detecting portion that detects a single piece of or a plurality pieces of operation data such that an amount of movement of a cursor of the information processing apparatus and an amount of movement of a cursor of a server coincide with each other, based on a corresponding relationship between the operation data, the amount of movement of the cursor of the information processing apparatus displayed on a screen of the information processing apparatus, and the amount of movement of the cursor of the server displayed on a window which is provided in the screen of the information processing apparatus, and the operation data input by the inputting portion, the cursor of the information processing apparatus moving according to the operation data input by the inputting portion, and the cursor of the server moving according to movement of the cursor of the information processing apparatus; and an outputting portion that outputs the single piece of or the plurality pieces of operation data detected by the detecting portion to the server.

With the above arrangement, a position gap between the cursor of the information processing apparatus and the cursor of the server does not occur, and it is therefore possible to provide a comfortable operating environment of the operating member for an operator of the information processing apparatus. For example, the inputting portion denotes a USB interface 38 in FIG. 2B, the detecting potion denotes a CPU 31 executing processes in FIGS. 5A, 6, 8A, and 8B, and the outputting portion denotes a network interface 37 in FIG. 2B.

Preferably, the information processing apparatus further comprises: a first calculating portion that calculates the amount of movement of the cursor of the information processing apparatus, the cursor of the information processing apparatus moving according to the operation data input by the inputting portion; an abstracting portion that abstracts an image of the cursor of the server; a position detecting portion that detects a position of the cursor of the server after the abstracted image of the cursor of the server is moved, the image of the cursor of the server moving according to the operation data input by the inputting portion; a second calculating portion that calculates the amount of movement of the cursor of the server, based on a position of the image of the cursor of the server before the abstracted image of the cursor of the server is moved, and the position of the image of the cursor of the server detected by the position detecting portion; and a first generating portion that generates first table data indicative of a corresponding relationship between the operation data input by the inputting portion, the amount of movement of the cursor of the information processing apparatus calculated by the first calculating portion, and the amount of movement of the cursor of the server calculated by the second calculating portion.

With the above arrangement, it is possible to detect the single piece of or the plurality pieces of operation data such that the amount of movement of the cursor of the information processing apparatus and the amount of movement of the cursor of the server coincide with each other, based on the first able data. For example, the first calculating portion denotes a CPU 31 executing a procedure of step S13 in FIG. 6, the abstracting portion denotes the CPU 31 executing a procedure of step S11 in FIG. 6, the position detecting portion denotes the CPU 31 executing a procedure of step S14 in FIG. 6, the second calculating portion denotes the CPU 31 executing a procedure of step S15 in FIG. 6, and the first generating portion denotes the CPU 31 executing a procedure of step S16 in FIG. 6. For example, the first table data is table data in FIG. 7A or 7B.

More preferably, the information processing apparatus further comprises a second generating portion that generates second table data indicative of a corresponding relationship between the amount of movement of the cursor of the information processing apparatus calculated by the first calculating portion, the amount of movement of the cursor of the server calculated by the second calculating portion, and the single piece of or the plurality pieces of operation data such that the amount of movement of the cursor of the information processing apparatus and the amount of movement of the cursor of the server coincide with each other, based on the first table data.

With the above arrangement, it is possible to quickly output to the server the single piece of or the plurality pieces of operation data such that the amount of movement of the cursor of the information processing apparatus and the amount of movement of the cursor of the server coincide with each other, based on the second table data. For example, the second generating portion denotes the CPU 31 generating table data in FIG. 7C.

Preferably, the detecting portion includes a third calculating portion that calculates the amount of movement of the cursor of the information processing apparatus, the cursor of the information processing apparatus moving according to the operation data input by the inputting portion, a coordinate detecting portion that detects coordinates of the cursor of the server after the cursor of the server is moved by the operation of an operator, a fourth calculating portion that calculates the amount of movement of the cursor of the server based on previous coordinates and current coordinates detected by the coordinate detecting portion, and a third generating portion that generates first table data indicative of a corresponding relationship between the operation data input by the inputting portion, the amount of movement of the cursor of the information processing apparatus calculated by the third calculating portion, and the amount of movement of the cursor of the server calculated by the fourth calculating portion.

With the above arrangement, it is possible to detect the single piece of or the plurality pieces of operation data such that the amount of movement of the cursor of the information processing apparatus and the amount of movement of the cursor of the server coincide with each other, based on the first table data. For example, the third calculating portion denotes the CPU 31 executing a procedure of step S62 in FIG. 11, the coordinate detecting portion denotes the CPU 31 executing a procedure of step S63 in FIG. 11, the fourth calculating portion denotes the CPU 31 executing a procedure of step S64 in FIG. 11, and the third generating portion denotes the CPU 31 executing a procedure of step S65 in FIG. 11. For example, the first table data is table data in FIG. 7A or 7B.

More preferably, the information processing apparatus further comprises a fourth generating portion that generates second table data indicative of a corresponding relationship between the amount of movement of the cursor of the information processing apparatus calculated by the third calculating portion, the amount of movement of the cursor of the server calculated by the fourth calculating portion, and the single piece of or the plurality pieces of operation data such that the amount of movement of the cursor of the information processing apparatus and the amount of movement of the cursor of the server coincide with each other, based on the first table data.

With the above arrangement, it is possible to quickly output to the server the single piece of or the plurality pieces of operation data such that the amount of movement of the cursor of the information processing apparatus and the amount of movement of the cursor of the server coincide with each other, based on the second table data. For example, the fourth generating portion denotes the CPU 31 generating table data in FIG. 7C.

Still more preferably, the information processing apparatus further comprises a receiving portion that receives the first table data or the second table data from a KVM switch or the server.

With the above arrangement, it is possible to utilize the first table data or the second table data received from the KVM switch or the server. For example, the receiving portion denotes a network interface 37.

Still more preferably, the information processing apparatus further comprises a transmitting portion that transmits the first table data or the second table data to a KVM switch or the server.

With the above arrangement, it is possible to transmit the first table data or the second table data to the KVM switch or the server. For example, the transmitting portion denotes the network interface 37.

Preferably, the information processing apparatus further comprises a limiting portion that limits a moving range of the cursor of the information processing apparatus in the window which is provided in the screen of the information processing apparatus, and on which the cursor of the server is displayed.

With the above arrangement, a position gap between the cursor of the information processing apparatus and the cursor of the server does not occur in the window which is provided in the screen of the information processing apparatus, and on which the cursor of the server is displayed. Therefore, it is possible to provide a comfortable operating environment of the operating member for an operator of the information processing apparatus. For example, the limiting portion denotes the CPU 31 executing a procedure of step S72 in FIG. 12A.

More preferably, the information processing apparatus further comprises a selecting portion that selects whether the limitation of the moving range of the cursor of the information processing apparatus is valid or invalid.

With the above arrangement, the operator of the information processing apparatus can select whether the limitation of the moving range of the cursor of the information processing apparatus is valid or invalid. For example, the selecting portion denotes the CPU 31 executing a procedure of step S71 in FIG. 12A, and a function key of a keyboard 13a or a menu display.

According to a second aspect of the present invention, there is provided an information processing apparatus that is connected to a server via a KVM switch to which a first operating member is connected, and that is connected to a second operating member and displays a cursor of the information processing apparatus which moves by operation of the second operating member and a cursor of the server which moves by operation of any one of the first operating member and the second operating member, comprising: a storing portion that stores a position of the cursor of the information processing apparatus when the operation is changed from the second operating member to the first operating member; an acquiring portion that acquires an accumulation value of data which is output from the KVM switch to the server during the operation of the first operating member; and a controlling portion that, when the second operating member is operated after the operation is changed from the first operating member to the second operating member, calculates a current position of the cursor of the server based on the stored position of the cursor of the information processing apparatus and the acquired accumulation value, calculates a difference between the current position of the cursor of the server and the current position of the cursor of the information processing apparatus, and outputs a combined value of the calculate difference and an amount of movement of the cursor of the information processing apparatus by the operation of the second operating member to the server.

With the above arrangement, even if the cursor of the server is moved by the first operating member connected to the KVM switch, a position gap between the cursor of the information processing apparatus and the cursor of the server can be corrected when the operation is changed from the first operating member to the second operating member and then the second operating member is operated. Therefore, it is possible to provide a comfortable operating environment of the second operating member for an operator of the information processing apparatus. For example, the storing portion denotes a CPU 31 executing a procedure of step S81 in FIG. 14A and a HDD 34, the acquiring portion denotes the CPU 31 executing a procedure of step S83 in FIG. 14A and a network interface 37, and the controlling portion denotes the CPU 31 executing procedures of steps S84 to S87 in FIG. 14A.

Preferably, the storing portion includes table data indicative of a corresponding relationship between an amount of movement of the cursor of the information processing apparatus, an amount of movement of the cursor of the server, and a single piece of or a plurality pieces of operation data such that the amount of movement of the cursor of the information processing apparatus and the amount of movement of the cursor of the server coincide with each other, the single piece of or the plurality pieces of operation data being output from the second operating member, and the controlling portion outputs the single piece of or the plurality pieces of operation data corresponding to the combined value to the server, based on the table data.

With the above arrangement, even if a so-called acceleration process of the mouse cursor is executed in the information processing apparatus and the server, a position gap between the cursor of the information processing apparatus and the cursor of the server can be corrected when the operation is changed from the first operating member to the second operating member and then the second operating member is operated. Therefore, it is possible to provide a comfortable operating environment of the second operating member for an operator of the information processing apparatus. For example, the first table data is table data in FIG. 7A or 7B.

Preferably, the accumulation value of data which is output from the KVM switch to the server is a calculation value calculated by abstracting an image of the cursor of the server, detecting a position of the cursor of the server after the abstracted image of the cursor of the server is moved by the operation of the first operating member, and calculating an amount of movement of the cursor of the server based on a position of the abstracted image before the abstracted image is moved and a position of the abstracted image after the abstracted image is moved.

With the above arrangement, the accumulation value of data which is output from the KVM switch to the server can be acquired from the image of the cursor of the server displayed on the information processing apparatus.

According to a third aspect of the present invention, there is provided an information processing apparatus that is connected to a server via a KVM switch to which a first operating member is connected, and that is connected to a second operating member and displays a window including a cursor of the information processing apparatus which moves by operation of the second operating member and a cursor of the server which moves by operation of any one of the first operating member and the second operating member, comprising: a storing portion that stores coordinates on a frame of the window which the cursor of the information processing apparatus passes when the cursor of the information processing apparatus moves to the outside of the window by the operation of the second operating member, and on which a position of the cursor of the server and a position of the cursor of the information processing apparatus coincide with each other; and a controlling portion that, when the cursor of the information processing apparatus reaches the window from the outside of the window, calculates a difference between coordinates indicative of the reach point on the frame of the window and the stored coordinates, and outputs the difference to the server.

With the above arrangement, even when the cursor of the information processing apparatus moves to the outside of the window by the operation of the second operating member, and then reaches the window from the outside of the window, a position gap between the cursor of the information processing apparatus and the cursor of the server can be corrected. Therefore, it is possible to provide a comfortable operating environment of the second operating member for an operator of the information processing apparatus. For example, the storing portion denotes a CPU 31 executing a procedure of step S111 in FIG. 17 and a HDD 34, and the controlling portion denotes the CPU 31 executing a procedure of step S115 in FIG. 17.

Preferably, when the cursor of the server is moved by the operation of the first operating member while the cursor of the information processing apparatus is moving the outside of the window, the controlling portion calculates a first difference between coordinates of the cursor of the server before and after the cursor of the server is moved, and causes the storing portion to store the first difference, and when the cursor of the information processing apparatus reaches the window from the outside of the window, the controlling portion calculates a second difference between coordinates indicative of the reach point on the frame of the window and the stored coordinates, combines the second difference with the first difference, and outputs the combined value to the server.

With the above arrangement, even when the cursor of the server is moved by the operation of the first operating member while the cursor of the information processing apparatus is moving the outside of the window, a position gap between the cursor of the information processing apparatus and the cursor of the server can be corrected. Therefore, it is possible to provide a comfortable operating environment of the second operating member for an operator of the information processing apparatus. The execution contents of the controlling portion correspond to procedures of steps S113 and S114 in FIG. 17.

According to a fourth aspect of the present invention, there is provided a KVM switch that is connected between an information processing apparatus to which an operating member is connected and the server, comprising: an inputting portion that inputs data indicative of an amount of movement of a cursor of the information processing apparatus; a detecting portion that detects a single piece of or a plurality pieces of operation data such that the amount of movement of a cursor of the information processing apparatus and an amount of movement of a cursor of a server coincide with each other, based on a corresponding relationship between operation data output from the operating member, the amount of movement of the cursor of the information processing apparatus displayed on a screen of the information processing apparatus, and the amount of movement of the cursor of the server displayed on the screen of the information processing apparatus, and the amount of movement of the cursor of the information processing apparatus indicated by the data input by the inputting portion, the cursor of the information processing apparatus moving according to the operation data, and the cursor of the server moving according to movement of the cursor of the information processing apparatus; and an outputting portion that outputs the single piece of or the plurality pieces of operation data detected by the detecting portion to the server.

With the above arrangement, a position gap between the cursor of the information processing apparatus and the cursor of the server does not occur, and it is therefore possible to provide a comfortable operating environment of the operating member for an operator of the information processing apparatus. For example, the inputting portion denotes a network interface 104a or 104b in FIG. 3, the detecting potion denotes a controller 101 executing processes in FIGS. 5B, 6, 8A, and 8B, and the outputting portion denotes an interface 103a or 103b in FIG. 3.

Preferably, the KVM switch further comprises a first calculating portion that calculates the amount of movement of the cursor of the information processing apparatus, the cursor of the information processing apparatus moving according to the operation data; an abstracting portion that abstracts an image of the cursor of the server; a position detecting portion that detects a position of the cursor of the server after the abstracted image of the cursor of the server is moved, the image of the cursor of the server moving according to the operation data; a second calculating portion that calculates the amount of movement of the cursor of the server, based on a position of the image of the cursor of the server before the abstracted image of the cursor of the server is moved, and the position of the image of the cursor of the server detected by the position detecting portion; and a first generating portion that generates first table data indicative of a corresponding relationship between the operation data, the amount of movement of the cursor of the information processing apparatus calculated by the first calculating portion, and the amount of movement of the cursor of the server calculated by the second calculating portion.

With the above arrangement, it is possible to detect the single piece of or the plurality pieces of operation data such that the amount of movement of the cursor of the information processing apparatus and the amount of movement of the cursor of the server coincide with each other, based on the first able data. For example, the first calculating portion denotes the controller 101 executing a procedure of step S13 in FIG. 6, the abstracting portion denotes the controller 101 executing a procedure of step S11 in FIG. 6, the position detecting portion denotes the controller 101 executing a procedure of step S14 in FIG. 6, the second calculating portion denotes the controller 101 executing a procedure of step S15 in FIG. 6, and the first generating portion denotes the controller 101 executing a procedure of step S16 in FIG. 6. For example, the first table data is table data in FIG. 7A or 7B.

More preferably, the KVM switch further comprises a second generating portion that generates second table data indicative of a corresponding relationship between the amount of movement of the cursor of the information processing apparatus calculated by the first calculating portion, the amount of movement of the cursor of the server calculated by the second calculating portion, and the single piece of or the plurality pieces of operation data such that the amount of movement of the cursor of the information processing apparatus and the amount of movement of the cursor of the server coincide with each other, based on the first table data.

With the above arrangement, it is possible to quickly output to the server the single piece of or the plurality pieces of operation data such that the amount of movement of the cursor of the information processing apparatus and the amount of movement of the cursor of the server coincide with each other, based on the second table data. For example, the second generating portion denotes the controller 101 generating table data in FIG. 7C.

Still more preferably, the KVM switch further comprises a receiving portion that receives the first table data or the second table data from the information processing apparatus or the server.

With the above arrangement, it is possible to utilize the first table data or the second table data received from the information processing apparatus or the server. For example, the receiving portion denotes a network interface 104a or 104b in FIG. 3, or an interface 103a or 103b in FIG. 3.

Still more preferably, the KVM switch further comprises a transmitting portion that transmits the first table data or the second table data to the information processing apparatus or the server.

With the above arrangement, it is possible to transmit the first table data or the second table data to the information processing apparatus or the server. For example, the transmitting portion denotes the network interface 104a or 104b in FIG. 3, or the interface 103a or 103b in FIG. 3.

Preferably, the KVM switch further comprises a limiting portion that limits a moving range of the cursor of the information processing apparatus in the window which is provided in the screen of the information processing apparatus, and on which the cursor of the server is displayed.

With the above arrangement, a position gap between the cursor of the information processing apparatus and the cursor of the server does not occur in the window which is provided in the screen of the information processing apparatus, and on which the cursor of the server is displayed. Therefore, it is possible to provide a comfortable operating environment of the operating member for an operator of the information processing apparatus. For example, the limiting portion denotes the controller 101 executing a procedure of step S72a in FIG. 12B.

Preferably, the KVM switch further comprises a selecting portion that selects whether the limitation of the moving range of the cursor of the information processing apparatus is valid or invalid.

With the above arrangement, the operator of the information processing apparatus can select whether the limitation of the moving range of the cursor of the information processing apparatus is valid or invalid. For example, the selecting portion denotes the controller 101 executing a procedure of step S71a in FIG. 12B, and a given switch on the KVM switch or a menu display.

According to a fifth aspect of the present invention, there is provided a KVM switch, to which a first operating member is connected, that is connectable to an information processing apparatus and a server, the an information processing apparatus being connected to a second operating member and displaying a cursor of the information processing apparatus which moves by operation of the second operating member and a cursor of the server which moves by operation of any one of the first operating member and the second operating member, the KVM switch comprising: a storing portion that acquires a position of the cursor of the information processing apparatus when the operation is changed from the second operating member to the first operating member from the information processing apparatus and stores the position, and stores an accumulation value of data which is output from the KVM switch to the server during the operation of the first operating member; and a controlling portion that acquires a position of the cursor of the information processing apparatus when the operation is changed from the first operating member to the second operating member from the information processing apparatus, calculates a current position of the cursor of the server based on the stored position of the cursor of the information processing apparatus and the stored accumulation value, calculates a difference between the current position of the cursor of the server and the position of the cursor of the information processing apparatus when the operation is changed from the first operating member to the second operating member, and outputs a combined value of the calculated difference and an amount of movement of the cursor of the information processing apparatus by the operation of second operating member to the server.

With the above arrangement, even if the cursor of the server is moved by the first operating member connected to the KVM switch, a position gap between the cursor of the information processing apparatus and the cursor of the server can be corrected when the operation is changed from the first operating member to the second operating member and then the second operating member is operated. Therefore, it is possible to provide a comfortable operating environment of the second operating member for an operator of the information processing apparatus. For example, the storing portion denotes a controller 101 executing procedures of steps S101 and S102 in FIG. 15 and a memory 105, and the controlling portion denotes the controller 101 executing procedures of steps S103 to S106 in FIG. 15.

Preferably, the storing portion includes table data indicative of a corresponding relationship between an amount of movement of the cursor of the information processing apparatus, an amount of movement of the cursor of the server, and a single piece of or a plurality pieces of operation data such that the amount of movement of the cursor of the information processing apparatus and the amount of movement of the cursor of the server coincide with each other, the single piece of or the plurality pieces of operation data being output from the second operating member, and the controlling portion outputs the single piece of or the plurality pieces of operation data corresponding to the combined value to the server, based on the table data.

With the above arrangement, even if a so-called acceleration process of the mouse cursor is executed in the information processing apparatus and the server, a position gap between the cursor of the information processing apparatus and the cursor of the server can be corrected when the operation is changed from the first operating member to the second operating member and then the second operating member is operated. Therefore, it is possible to provide a comfortable operating environment of the second operating member for an operator of the information processing apparatus. For example, the first table data is table data in FIG. 7C.

According to a sixth aspect of the present invention, there is provided a KVM switch, to which a first operating member is connected, that is connectable to an information processing apparatus and a server, the information processing apparatus being connected to a second operating member and displaying a window including a cursor of the information processing apparatus which moves by operation of the second operating member and a cursor of the server which moves by operation of any one of the first operating member and the second operating member, the KVM switch comprising: a storing portion that acquires from the information processing apparatus coordinates on a frame of the window which the cursor of the information processing apparatus passes when the cursor of the information processing apparatus moves to the outside of the window by the operation of the second operating member, and on which a position of the cursor of the server and a position of the cursor of the information processing apparatus coincide with each other, and stores the coordinates; and a controlling portion that, when the cursor of the information processing apparatus reaches the window from the outside of the window, acquires coordinates indicative of the reach point on the frame of the window from the information processing apparatus, calculates a difference between the acquired coordinates indicative of the reach point on the frame of the window and the stored coordinates, and outputs the difference to the server.

With the above arrangement, even when the cursor of the information processing apparatus moves to the outside of the window by the operation of the second operating member, and then reaches the window from the outside of the window, a position gap between the cursor of the information processing apparatus and the cursor of the server can be corrected. Therefore, it is possible to provide a comfortable operating environment of the second operating member for an operator of the information processing apparatus. For example, the storing portion denotes a controller 101 executing a procedure of step S121 in FIG. 18 and a memory 105, and the controlling portion denotes the controller 101 executing a procedure of step S125 in FIG. 18.

Preferably, when the cursor of the server is moved by the operation of the first operating member while the cursor of the information processing apparatus is moving the outside of the window, the controlling portion calculates a first difference between coordinates of the cursor of the server before and after the cursor of the server is moved, and causes the storing portion to store the first difference, and when the cursor of the information processing apparatus reaches the window from the outside of the window, the controlling portion acquires coordinates indicative of the reach point on the frame of the window from the information processing apparatus, calculates a second difference between the acquired coordinates indicative of the reach point on the frame of the window and the stored coordinates, combines the second difference with the first difference, and outputs the combined value to the server.

With the above arrangement, even when the cursor of the server is moved by the operation of the first operating member while the cursor of the information processing apparatus is moving the outside of the window, a position gap between the cursor of the information processing apparatus and the cursor of the server can be corrected. Therefore, it is possible to provide a comfortable operating environment of the second operating member for an operator of the information processing apparatus. The execution contents of the controlling portion correspond to procedures of steps S123 and S124 in FIG. 18.

According to a seventh aspect of the present invention, there is provided a server that is connected between an information processing apparatus to which an operating member is connected and a KVM switch, comprising: an inputting portion that inputs data indicative of an amount of movement of a cursor of the information processing apparatus; a deciding portion that decides operation data output from the operating member based on the order of inputting the data indicative of the amount of movement of the cursor of the information processing apparatus; a detecting portion that detects a single piece of or a plurality pieces of operation data such that an amount of movement of the cursor of the information processing apparatus and an amount of movement of a cursor of a server coincide with each other, based on a corresponding relationship between the decided operation data, the amount of movement of the cursor of the information processing apparatus displayed on a screen of the information processing apparatus, and the amount of movement of the cursor of the server displayed on the screen of the information processing apparatus, and the amount of movement of the cursor of the information processing apparatus indicated by the data input by the inputting portion, the cursor of the information processing apparatus moving according to the operation data, and the cursor of the server moving according to movement of the cursor of the information processing apparatus; and a moving portion that moves the cursor of the server based on the single piece of or the plurality pieces of operation data detected by the detecting portion.

With the above arrangement, a position gap between the cursor of the information processing apparatus and the cursor of the server does not occur, and it is therefore possible to provide a comfortable operating environment of the operating member for an operator of the information processing apparatus. For example, the inputting portion denotes a USB interface 28 in FIG. 2A, the detecting potion and the moving portion denote a CPU 21 in FIG. 2A, and the detecting portion denotes the CPU 21 executing processes in FIGS. 9A and 9B.

Preferably, the detecting portion includes an acquiring portion that executes an acceleration process to the data indicative of the amount of movement of the cursor of the information processing apparatus input by the inputting portion, and a first generating portion that generates first table data indicative of a corresponding relationship between the operation data decided by the deciding portion, the amount of movement of the cursor of the information processing apparatus input by the inputting portion, and the amount of movement of the cursor of the server acquired by the acquiring portion.

With the above arrangement, it is possible to detect the single piece of or the plurality pieces of operation data such that the amount of movement of the cursor of the information processing apparatus and the amount of movement of the cursor of the server coincide with each other, based on the first able data. For example, the acquiring portion denotes the CPU 21 executing a procedure of step S42 in FIG. 9B, and the first generating portion denotes the CPU 21 executing a procedure of step S43 in FIG. 9B. For example, the first table data is table data in FIG. 7A or 7B.

More preferably, the server further comprises a second generating portion that generates second table data indicative of a corresponding relationship between the amount of movement of the cursor of the information processing apparatus input by the inputting portion, the amount of movement of the cursor of the server acquired by the acquiring portion, and the single piece of or the plurality pieces of operation data such that the amount of movement of the cursor of the information processing apparatus and the amount of movement of the cursor of the server coincide with each other, based on the first table data.

With the above arrangement, it is possible to quickly detect the single piece of or the plurality pieces of operation data such that the amount of movement of the cursor of the information processing apparatus and the amount of movement of the cursor of the server coincide with each other, based on the second table data, and to quickly move the cursor of the server. For example, the second generating portion denotes the CPU 21 generating table data in FIG. 7C.

Still more preferably, the server further comprises a receiving portion that receives the first table data or the second table data from the information processing apparatus or the KVM switch.

With the above arrangement, it is possible to utilize the first table data or the second table data received from the information processing apparatus or the KVM switch. For example, the receiving portion denotes a USB interface 28.

Still more preferably, the server further comprises a transmitting portion that transmits the first table data or the second table data to the information processing apparatus or the KVM switch.

With the above arrangement, it is possible to transmit the first table data or the second table data to the information processing apparatus or the KVM switch. For example, the transmitting portion denotes the USB interface 28.

According to an eighth aspect of the present invention, there is provided a computer readable medium causing an information processing apparatus to execute a process, the process comprising: an inputting step that inputs operation data from an operating member; a detecting step that detects a single piece of or a plurality pieces of operation data such that an amount of movement of a cursor of the information processing apparatus and an amount of movement of a cursor of a server coincide with each other, based on a corresponding relationship between the operation data, the amount of movement of the cursor of the information processing apparatus displayed on a screen of the information processing apparatus, and the amount of movement of the cursor of the server displayed on a window which is provided in the screen of the information processing apparatus, and the operation data input in the inputting step, the cursor of the information processing apparatus moving according to the operation data input in the inputting step, and the cursor of the server moving according to movement of the cursor of the information processing apparatus; and an outputting step that outputs the single piece of or the plurality pieces of operation data detected by the detecting portion to the server.

With the above arrangement, a position gap between the cursor of the information processing apparatus and the cursor of the server does not occur, and it is therefore possible to provide a comfortable operating environment of the operating member for an operator of the information processing apparatus.

According to a ninth aspect of the present invention, there is provided a computer readable medium causing an information processing apparatus to execute a process, the information processing apparatus being connected to a server via a KVM switch to which a first operating member is connected, and being connected to a second operating member and displaying a cursor of the information processing apparatus which moves by operation of the second operating member and a cursor of the server which moves by operation of any one of the first operating member and the second operating member, the process comprising: a storing step that stores a position of the cursor of the information processing apparatus into a memory when the operation is changed from the second operating member to the first operating member; an acquiring step that acquires an accumulation value of data which is output from the KVM switch to the server during the operation of the first operating member; and a controlling step that, when the second operating member is operated after the operation is changed from the first operating member to the second operating member, calculates a current position of the cursor of the server based on the stored position of the cursor of the information processing apparatus and the acquired accumulation value, calculates a difference between the current position of the cursor of the server and the current position of the cursor of the information processing apparatus, and outputs a combined value of the calculate difference and an amount of movement of the cursor of the information processing apparatus by the operation of the second operating member to the server.

With the above arrangement, even if the cursor of the server is moved by the first operating member connected to the KVM switch, a position gap between the cursor of the information processing apparatus and the cursor of the server can be corrected when the operation is changed from the first operating member to the second operating member and then the second operating member is operated. Therefore, it is possible to provide a comfortable operating environment of the second operating member for an operator of the information processing apparatus.

According to a tenth aspect of the present invention, there is provided a computer readable medium causing an information processing apparatus to execute a process, the information processing apparatus being connected to a server via a KVM switch to which a first operating member is connected, and being connected to a second operating member and displaying a window including a cursor of the information processing apparatus which moves by operation of the second operating member and a cursor of the server which moves by operation of any one of the first operating member and the second operating member, the process comprising: a storing step that stores into a memory coordinates on a frame of the window which the cursor of the information processing apparatus passes when the cursor of the information processing apparatus moves to the outside of the window by the operation of the second operating member, and on which a position of the cursor of the server and a position of the cursor of the information processing apparatus coincide with each other; and a controlling step that, when the cursor of the information processing apparatus reaches the window from the outside of the window, calculates a difference between coordinates indicative of the reach point on the frame of the window and the stored coordinates, and outputs the difference to the server.

With the above arrangement, even when the cursor of the information processing apparatus moves to the outside of the window by the operation of the second operating member, and then reaches the window from the outside of the window, a position gap between the cursor of the information processing apparatus and the cursor of the server can be corrected. Therefore, it is possible to provide a comfortable operating environment of the second operating member for an operator of the information processing apparatus.

According to an eleventh aspect of the present invention, there is provided a computer readable medium causing a KVM switch to execute a process, the KVM switch being connected between an information processing apparatus to which an operating member is connected and the server, the process comprising: an inputting step that inputs data indicative of an amount of movement of a cursor of the information processing apparatus; a detecting step that detects a single piece of or a plurality pieces of operation data such that the amount of movement of a cursor of the information processing apparatus and an amount of movement of a cursor of a server coincide with each other, based on a corresponding relationship between operation data output from the operating member, the amount of movement of the cursor of the information processing apparatus displayed on a screen of the information processing apparatus, and the amount of movement of the cursor of the server displayed on the screen of the information processing apparatus, and the amount of movement of the cursor of the information processing apparatus indicated by the data input in the inputting step, the cursor of the information processing apparatus moving according to the operation data, and the cursor of the server moving according to movement of the cursor of the information processing apparatus; and an outputting step that outputs the single piece of or the plurality pieces of operation data detected in the detecting step to the server.

With the above arrangement, a position gap between the cursor of the information processing apparatus and the cursor of the server does not occur, and it is therefore possible to provide a comfortable operating environment of the operating member for an operator of the information processing apparatus.

According to a twelfth aspect of the present invention, there is provided a computer readable medium causing a KVM switch to execute a process, the KVM switch, to which a first operating member is connected, being connectable to an information processing apparatus and a server, the information processing apparatus being connected to a second operating member and displaying a cursor of the information processing apparatus which moves by operation of the second operating member and a cursor of the server which moves by operation of any one of the first operating member and the second operating member, the process comprising: a storing step that acquires a position of the cursor of the information processing apparatus when the operation is changed from the second operating member to the first operating member from the information processing apparatus and stores the position into a memory, and stores an accumulation value of data which is output from the KVM switch to the server into the memory during the operation of the first operating member; and a controlling step that acquires a position of the cursor of the information processing apparatus when the operation is changed from the first operating member to the second operating member from the information processing apparatus, calculates a current position of the cursor of the server based on the stored position of the cursor of the information processing apparatus and the stored accumulation value, calculates a difference between the current position of the cursor of the server and the position of the cursor of the information processing apparatus when the operation is changed from the first operating member to the second operating member, and outputs a combined value of the calculated difference and an amount of movement of the cursor of the information processing apparatus by the operation of second operating member to the server.

With the above arrangement, even if the cursor of the server is moved by the first operating member connected to the KVM switch, a position gap between the cursor of the information processing apparatus and the cursor of the server can be corrected when the operation is changed from the first operating member to the second operating member and then the second operating member is operated. Therefore, it is possible to provide a comfortable operating environment of the second operating member for an operator of the information processing apparatus.

According to a thirteenth aspect of the present invention, there is provided a computer readable medium causing a KVM switch to execute a process, the KVM switch, to which a first operating member is connected, being connectable to an information processing apparatus and a server, the information processing apparatus being connected to a second operating member and displaying a window including a cursor of the information processing apparatus which moves by operation of the second operating member and a cursor of the server which moves by operation of any one of the first operating member and the second operating member, the process comprising: a storing step that acquires from the information processing apparatus coordinates on a frame of the window which the cursor of the information processing apparatus passes when the cursor of the information processing apparatus moves to the outside of the window by the operation of the second operating member, and on which a position of the cursor of the server and a position of the cursor of the information processing apparatus coincide with each other, and stores the coordinates into a memory; and a controlling step that, when the cursor of the information processing apparatus reaches the window from the outside of the window, acquires coordinates indicative of the reach point on the frame of the window from the information processing apparatus, calculates a difference between the acquired coordinates indicative of the reach point on the frame of the window and the stored coordinates, and outputs the difference to the server.

With the above arrangement, even when the cursor of the information processing apparatus moves to the outside of the window by the operation of the second operating member, and then reaches the window from the outside of the window, a position gap between the cursor of the information processing apparatus and the cursor of the server can be corrected. Therefore, it is possible to provide a comfortable operating environment of the second operating member for an operator of the information processing apparatus.

According to a fourteenth aspect of the present invention, there is provided a computer readable medium causing a server to execute a process, the server being connected between an information processing apparatus to which an operating member is connected and a KVM switch, the process comprising: an inputting step that inputs data indicative of an amount of movement of a cursor of the information processing apparatus; a deciding step that decides operation data output from the operating member based on the order of inputting the data indicative of the amount of movement of the cursor of the information processing apparatus; a detecting step that detects a single piece of or a plurality pieces of operation data such that an amount of movement of the cursor of the information processing apparatus and an amount of movement of a cursor of a server coincide with each other, based on a corresponding relationship between the decided operation data, the amount of movement of the cursor of the information processing apparatus displayed on a screen of the information processing apparatus, and the amount of movement of the cursor of the server displayed on the screen of the information processing apparatus, and the amount of movement of the cursor of the information processing apparatus indicated by the data input in the inputting step, the cursor of the information processing apparatus moving according to the operation data, and the cursor of the server moving according to movement of the cursor of the information processing apparatus; and a moving step that moves the cursor of the server based on the single piece of or the plurality pieces of operation data detected in the detecting step.

With the above arrangement, a position gap between the cursor of the information processing apparatus and the cursor of the server does not occur, and it is therefore possible to provide a comfortable operating environment of the operating member for an operator of the information processing apparatus.

BRIEF DESCRIPTION OF THE DRAWINGS

Preferred embodiments of the present invention will be described in detail with reference to the following drawings, wherein:

FIG. 2A is a block diagram showing the construction of a server 2a;

FIG. 2B is a block diagram showing the hardware construction of a PC 11a;

FIG. 4A is a diagram showing an example of the screen of the server 2a;

FIG. 4C is a diagram showing an example of the screen of the PC 11a;

FIG. 7A is a diagram showing an example of table data generated by step S16;

FIG. 7B is a diagram showing an example of table data in which each value in FIG. 7A is rounded off;

FIG. 7C is a diagram showing an example of table data which makes a position of a mouse cursor 126 of the PC 11a and a position of a mouse cursor 122 of the server 2a coincide with each other;

FIG. 10 is a diagram showing an example of the screen of the PC 11a;

FIG. 17 is a flowchart showing a process executed by a CPU 31 of the PC 11a;

DESCRIPTION OF THE PREFERRED EMBODIMENTS

A description will now be given, with reference to the accompanying drawings, of embodiments of the present invention.

First Embodiment

Figure 1:
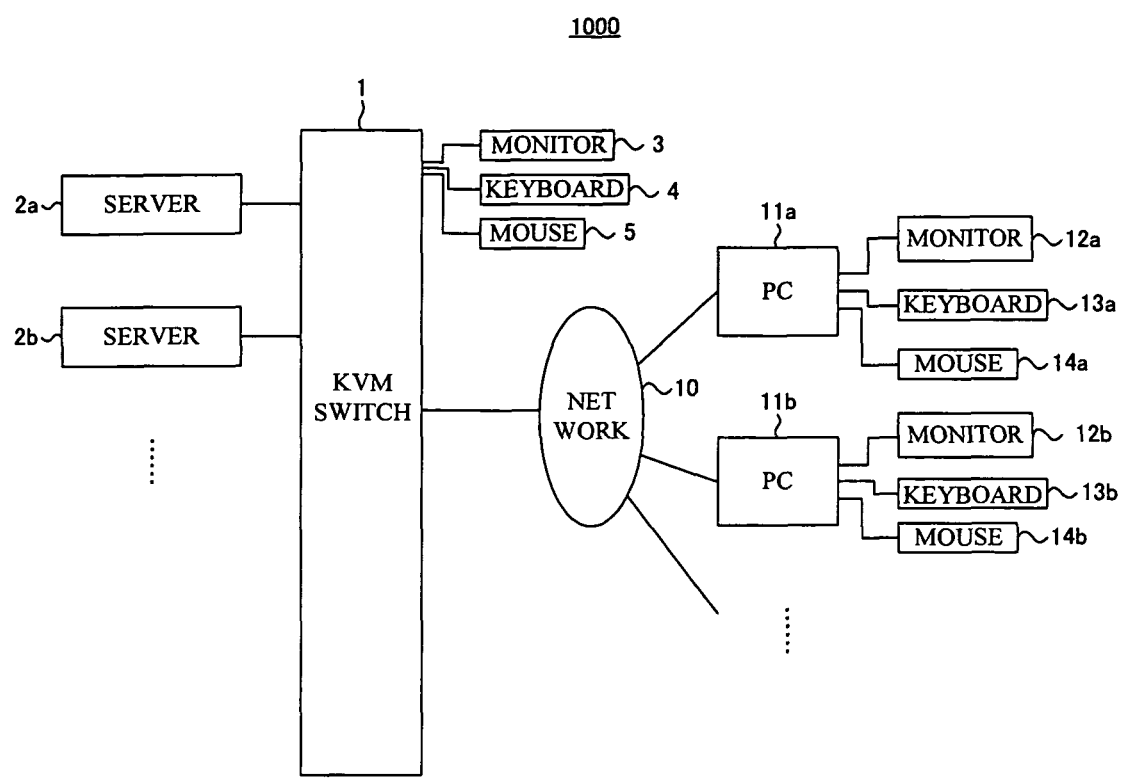
FIG. 1 is a block diagram showing the construction of a KVM (K: keyboard, V: video, M: mouse) system including a KVM switch, an information processing apparatus, and a server according to a first embodiment of the present invention.

FIG. 1 is a block diagram showing the construction of a KVM (K: keyboard, V: video, M: mouse) system including a KVM switch, an information processing apparatus, and a server according to a first embodiment of the present invention.

In FIG. 1, a KVM system 1000 is provided with a KVM (K: keyboard, V: video, M: mouse) switch, servers 2a and 2b, a monitor 3, a keyboard 4, and a mouse 5. These elements compose a local system. That is, the monitor 3 can display a video signal output from the server 2a or 2b, and the keyboard 4 and the mouse 5 can output data to the server 2a or 2b.

The KVM system 1000 is a switching system for multi-monitor, and is provided with a PC 11a connected to a monitor 12a, a keyboard 13a, and a mouse 14a, and a PC 11b connected to monitors 12b to 12e, a keyboard 13b, and a mouse 14b. The PC 11a and the PC 11b are remote terminals connected to the KVM switch 1 via a network 10, and compose a so-called remote system. That is, a user can operate the server 2a or the server 2b via the network 10 and the KVM switch 11, from a remote operating application operated on the PC 11a or the PC 11b.

The number of servers or remote terminals (PCs) connected to the KVM switch 1 may be the singular and the plural.

Figure 2A:
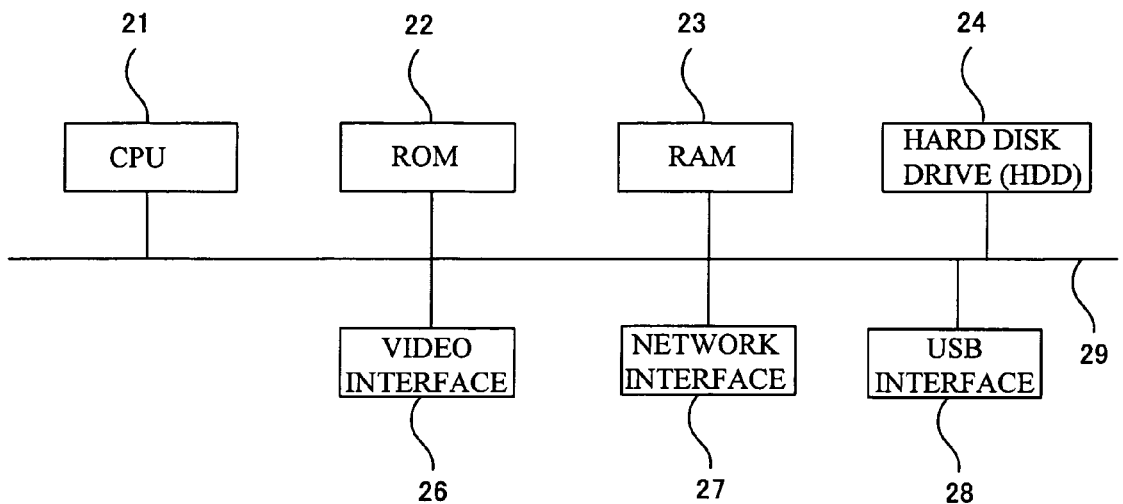
Figure 2B:
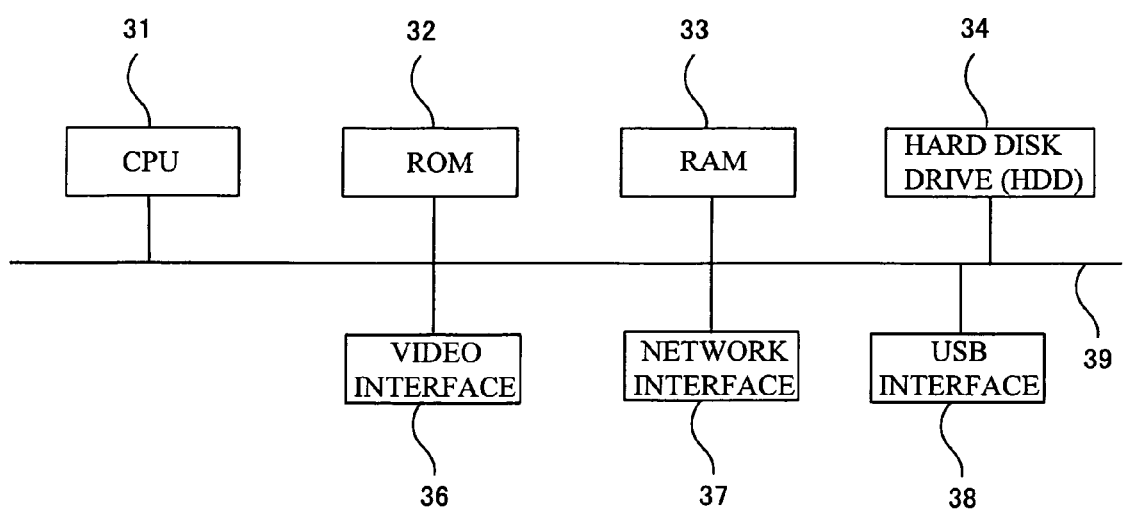

FIG. 2A is a block diagram showing the construction of the server 2a, and FIG. 2B is a block diagram showing the hardware construction of the PC 11a. The hardware construction of the server 2b is the same as that of the server 2a, and the hardware construction of the PC 11b is the same as that of the PC 11a.

The server 2a has a CPU 21 that controls the entire device, a ROM 22 that stores control programs, a RAM 23 that functions as a working area, a hard disk drive (HDD) 24 that stores various kinds of information and programs, a video interface 26 that outputs a video signal, a network interface 27, and a USB (Universal Serial Bus) interface 28. The CPU 21 is connected to the ROM 22, the RAM 23, the hard disk drive (HDD) 24, the video interface 26, the network interface 27, and the USB interface 28 via a system bus 29. The USB interface 28 is used for connecting to the KVM switch 1, used when table data in FIGS. 7A to 7C described later is transmitted to the KVM switch 1, the PC 11a or the PC 11b, and used when the table data in FIGS. 7A to 7C is received from the KVM switch 1, the PC 11a or the PC 11b.

The PC 11a has a CPU 31 that controls the entire device, a ROM 32 that stores control programs, a RAM 33 that functions as a working area, a hard disk drive (HDD) 34 that stores various kinds of information and programs, a video interface 36 that outputs a video signal, a network interface 37 that is connects to the KVM switch 1 or other computers, and a USB (Universal Serial Bus) interface 38 that is connects to USB devices, not shown. The CPU 31 is connected to the ROM 32, the RAM 33, the hard disk drive (HDD) 34, the video interface 36, the network interface 37, and the USB interface 38 via a system bus 39.

The monitor 12a is connected to the video interface 36, the key board 13a and the mouse 14a are connected to the USB interface. The network interface 37 is used for connecting to the KVM switch 1, used when the table data in FIGS. 7A to 7C described later is transmitted to the KVM switch 1, the server 2a or the server 2b, and used when the table data in FIGS. 7A to 7C is received from the KVM switch 1, the server 2a or the server 2b.

Figure 3:
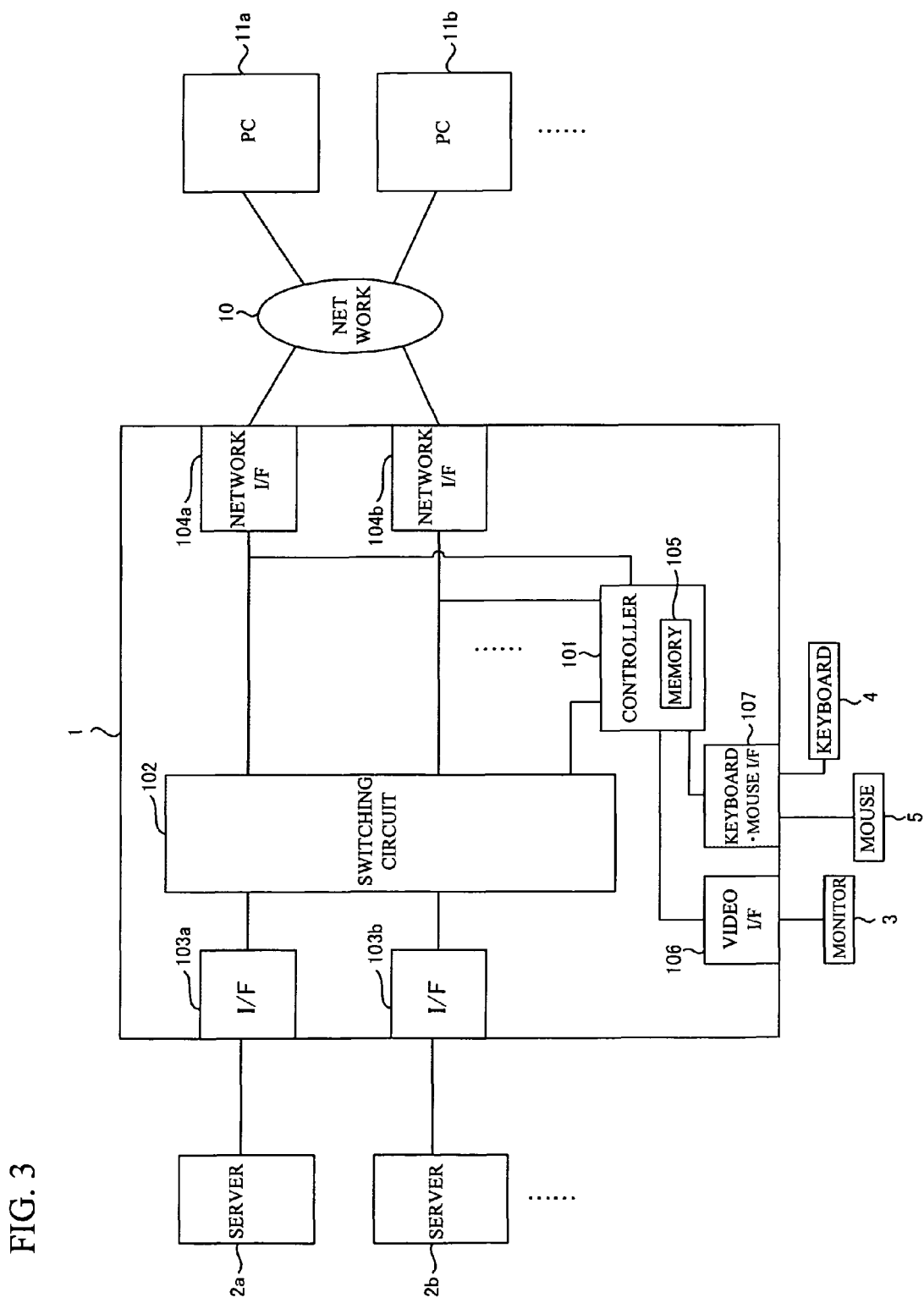
FIG. 3 is a block diagram showing the hardware construction of a KVM switch 1.

FIG. 3 is a block diagram showing the hardware construction of the KVM switch 1.

The KVM switch 1 has a controller 101 that controls the operation of the entire switch, a switching circuit 102 that switches a destination of the output of the video signal and a destination of the input of data from the mouse or the keyboard, interface circuits (I/F) 103a and 103b that connect to the servers 2a and 2b, respectively, network interfaces (I/F) 104a and 104b that connect to the PCs 11a and 11b via a network 10, a video interface (I/F) 106 that connects to the monitor 3, and a keyboard/mouse interface (I/F) 107 that connects to the keyboard 4 and the mouse 5. The controller 101 has a memory 105 storing various kinds of control programs and data.

The interface circuits (I/F) 103a and 103b are used when the table data in FIGS. 7A to 7C described later is transmitted to the server 2a and the server 2b, and used when the table data in FIGS. 7A to 7C is received from the server 2a and the server 2b. The network interfaces (I/F) 104a and 104b are used when the table data in FIGS. 7A to 7C described later is transmitted to the PC 11a and the PC 11b, and used when the table data in FIGS. 7A to 7C is received from the PC 11a and the PC 11b.

Although in the following explanations, the server 2a is used as an example of the representative of the server, and the PC 11a is used as an example of the representative of the remote terminal, the server and the remote terminal are not limited to them.

In the present embodiment, to realize the position gap correcting function which is not controlled by an acceleration process of the mouse cursor of the server 2a, the PC 11a or the KVM switch 1 has a function which automatically generates the table data (see FIGS. 7A to 7c) to correct mouse data output from the mouse 14a. The position gap correcting function represents a function executing a correction that makes the position of a mouse cursor of the PC 11a displayed on the PC 11a and the position of a mouse cursor of the server 2a displayed on the PC 11a coincide with each other when these mouse cursors do not coincide with each other.

First, a description will now be given of a first function which automatically generates the table data to correct the mouse data.

Figure 4C:
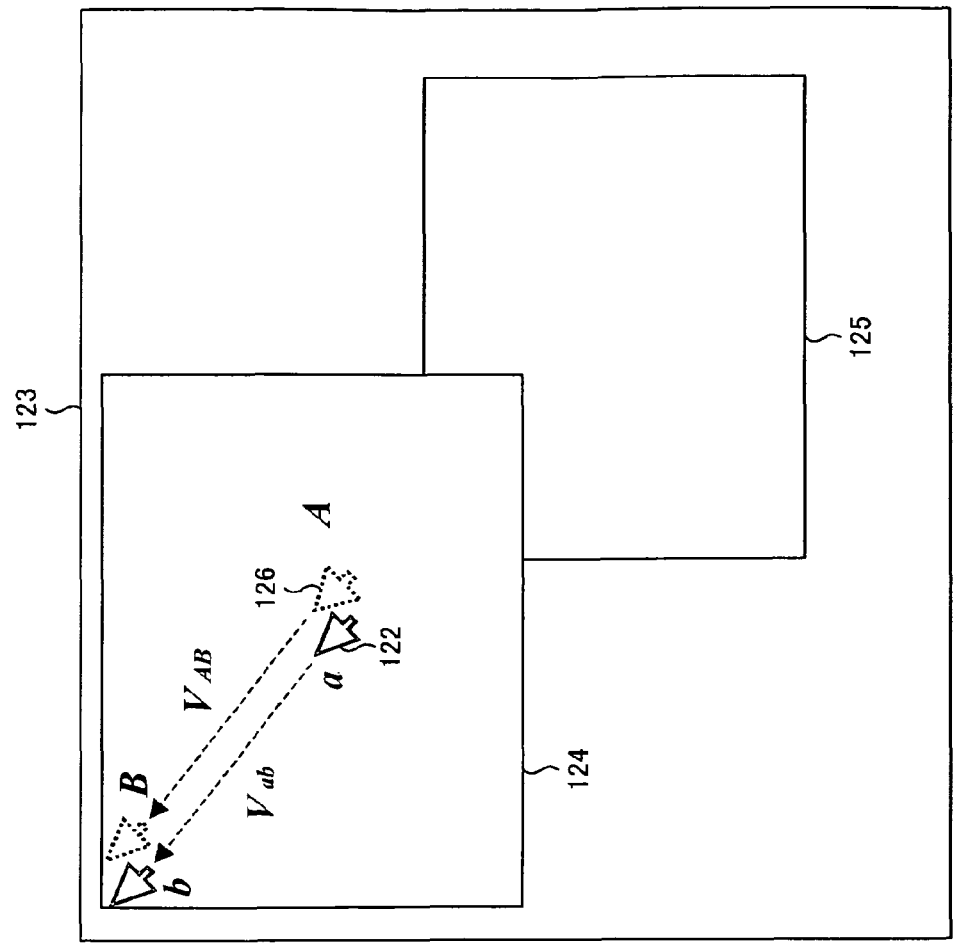
Figure 4A:
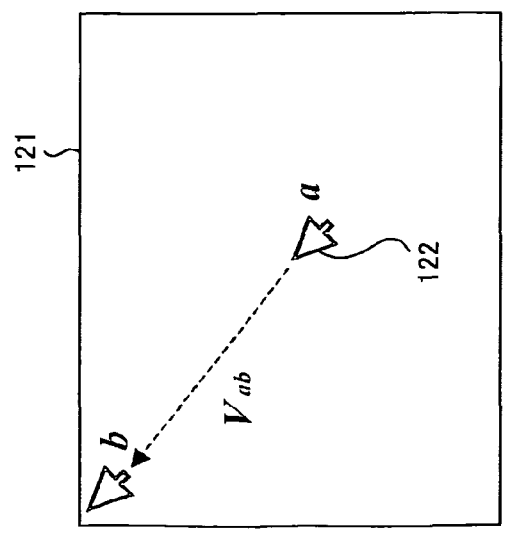
Figure 4B:
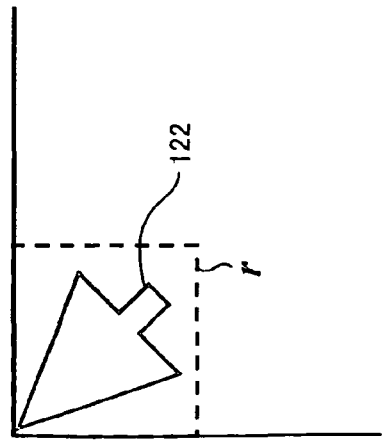
FIG. 4B is a fragmentary enlarged view of FIG. 4A.

FIG. 4A is a diagram showing an example of the screen of the server 2a, FIG. 4B is a fragmentary enlarged view of FIG. 4A, and FIG. 4C is a diagram showing an example of the screen of the PC 11a. Further, FIGS. 5A and 5B are flowcharts showing position gap correcting functions.

In FIG. 4A, reference numeral 121 denotes a screen of the server 2a, and reference numeral 122 denotes a mouse cursor of the server 2a. In FIG. 4C, reference numeral 123 denotes a screen of the PC 11a, and reference numeral 126 denotes a mouse cursor of the PC 11a. Reference numeral 124 denotes a window where non-display of the mouse cursor 126 of the PC 11a has been set, and reference numeral 125 denotes another window where display of the mouse cursor has been set. On the window 124, the screen of the server 2a is displayed, and the mouse cursor 122 of the server 2*a* is displayed. The display or non-display of the mouse cursor in the window 124 and the window 125 can be set by an operating system of the PC 11*a*.

In an initial state, although the mouse cursor 122 of the server 2*a* may be at any position on the screen 121 as shown in FIG. 4A, the mouse cursor 122 of the server 2*a* is assumed to be at a position "a", for example. If the mouse cursor 126 of the PC 11*a* is directly above the window 125, for example, the mouse cursor 126 of the PC 11*a* is moved directly above the window 124 in the present process, and hence the mouse cursor 126 of the PC 11*a* may be at any position on the screen 123.

Figure 5A:
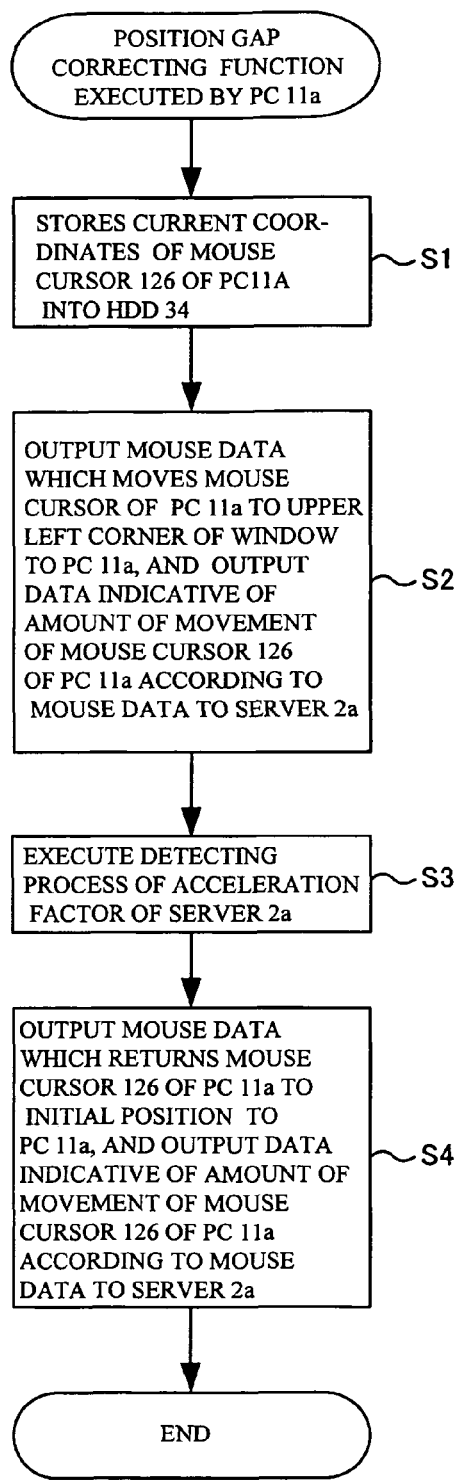
FIGS. 5A and 5B are flowcharts showing position gap correcting functions.
Figure 5B:
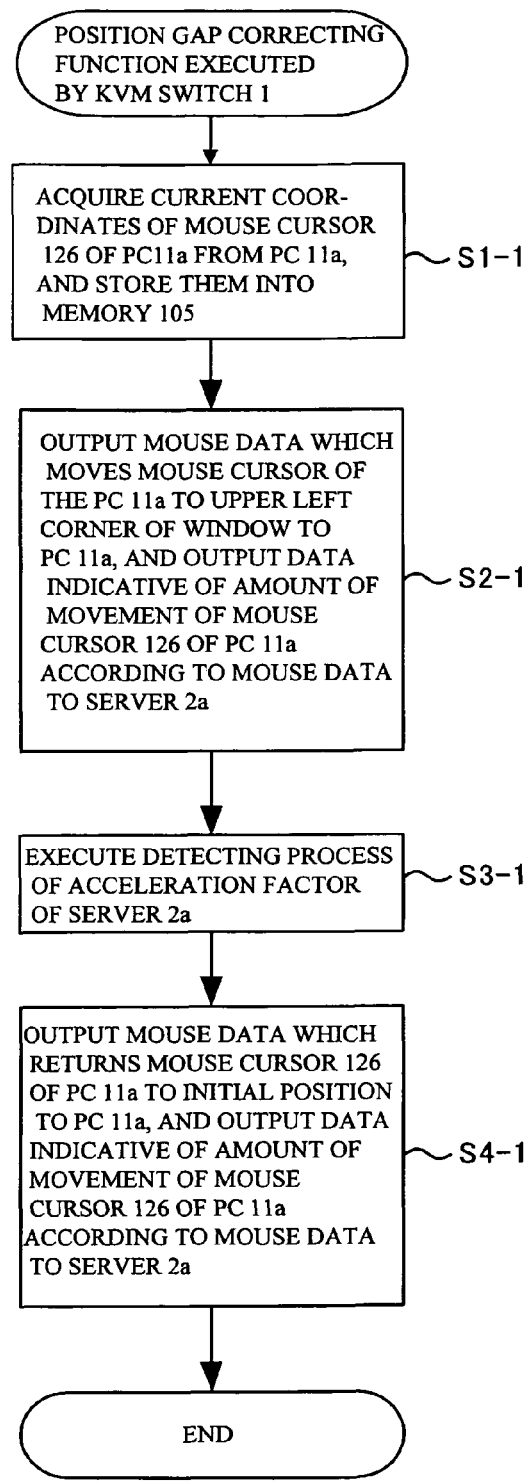

In FIG. 5A, the CPU 31 of the PC 11*a* stores current coordinates of the mouse cursor 126 of the PC 11*a* into the HDD 34 (step S1). As a result, the coordinates at the position "A" of the mouse cursor 126 in FIG. 4C are stored into the HDD 34.

Next, the CPU 31 of the PC 11*a* outputs the mouse data which moves the mouse cursor 126 of the PC 11*a* to an upper left corner of the window 124 to the PC 11*a*, and outputs data indicative of the amount of movement of the mouse cursor 126 of the PC 11*a* according to the mouse data to the server 2*a* via the KVM switch 1 (step S2). Therefore, the mouse cursor 122 of the server 2*a* in FIG. 4A is moved from the position "a" to the position "b", and the mouse cursor 126 in FIG. 4C is moved from the position "A" to the position "B".

The mouse data which the mouse 14*a* can output is 1 to 255. An amount of movement of the mouse cursor 126 of the PC 11*a* is indicated as "$V_{AB}$", as shown in FIG. 4C, and an amount in which the mouse data reaches server 2*a* and the mouse cursor 122 of the server 2*a* moves actually is indicated as "$V_{ab}$". The relationship between these two amounts of the movement is $V_{AB} \ll V_{ab}$, the $V_{ab}$ is much bigger than the $V_{AB}$. The mouse cursor 122 of the server 2*a* and the mouse cursor 126 of the PC 11*a* are not controlled by an acceleration process of the mouse cursor of the server 2*a*, and are moved at the position "B" of the upper left corner of the screen 121 and at the position "b" of the upper left corner of the window 121, respectively.

Next, the CPU 31 of the PC 11*a* executes a detecting process of an acceleration factor of the server 2*a* (step S3). This process is executed to examine how data showing the amount of movement of the mouse cursor 126 of the PC 11*a*, which the PC 11*a* outputs to the server 2*a* via the KVM switch 1, is accelerated in the server 2*a*. By this process, the PC 11*a* perfectly understands the acceleration factor of the server 2*a*, and can output data optimized to the acceleration process executed by the server 2*a* via the KVM switch 1. The detecting process of the acceleration factor of the server 2*a* will be described later in detail.

Finally, the CPU 31 of the PC 11*a* outputs mouse data which returns the mouse cursor 126 of the PC 11*a* from the coordinates of the upper left corner of the window 124 to the coordinates (i.e., coordinates of the position "A") of the mouse cursor 126 of the PC 11*a* stored into the HDD 34, to the PC 11*a*, and outputs data indicative of the amount of movement of the mouse cursor 126 of the PC 11*a* according to the mouse data to the server 2*a* via the KVM switch 1 (step S4). The mouse data of the step S2 and the mouse data of the step S4 are the same in the amount of movement as each together, but the positive sign and negative sign thereof are different from each other. As a result, the mouse cursor 126 of the PC 11*a* returns from the position "B" to the position "A", and the mouse cursor 122 of the server 2*a* returns from the position "b" to the position "a".

Although the CPU 31 of the PC 11*a* executes the position gap correcting function in FIG. 5A, the controller 101 of the KVM switch 1 executes the position gap correcting function in FIG. 5B.

In FIG. 5B, the controller 101 of the KVM switch 1 acquires current coordinates of the mouse cursor 126 of the PC 11*a* from the PC 11*a*, and stores them into the memory 105 (step S1-1). Therefore, the coordinates at the position "A" of the mouse cursor 126 in FIG. 4C is stored into the memory 105.

Next, the controller 101 of the KVM switch 1 outputs the mouse data which moves the mouse cursor 126 of the PC 11*a* to an upper left corner of the window 124 to the PC 11*a*, and outputs data indicative of the amount of movement of the mouse cursor 126 of the PC 11*a* according to the mouse data to the server 2*a* (step S2-1). Therefore, the mouse cursor 122 of the server 2*a* in FIG. 4A is moved from the position "a" to the position "b", and the mouse cursor 126 in FIG. 4C is moved from the position "A" to the position "B". The mouse data which the mouse 14*a* can output is 1 to 255.

Next, the controller 101 of the KVM switch 1 executes a detecting process of an acceleration factor of the server 2*a* (step S3-1). This process is executed to examine how data showing the amount of movement of the mouse cursor 126 of the PC 11*a*, which is outputs to the server 2*a*, is accelerated in the server 2*a*. By this process, the KVM switch 1 perfectly understands the acceleration factor of the server 2*a*, and can output data optimized to the acceleration process executed by the server 2*a*. The detecting process of the acceleration factor of the server 2*a* will be described later in detail.

Finally, the controller 101 of the KVM switch 1 outputs mouse data which returns the mouse cursor 126 of the PC 11*a* from the coordinates of the upper left corner of the window 124 to an original position (i.e., coordinates of the position "A") of the mouse cursor 126 of the PC 11*a* stored into the memory 105, to the PC 11*a*, and outputs data indicative of the amount of movement of the mouse cursor 126 of the PC 11*a* according to the mouse data to the server 2*a* (step S4-1). The mouse data of the step S2-1 and the mouse data of the step S4-1 are the same in the amount of movement as each together, but the positive sign and negative sign thereof are different from each other. As a result, the mouse cursor 126 of the PC 11*a* returns from the position "B" to the position "A", and the mouse cursor 122 of the server 2*a* returns from the position "b" to the position "a".

Figure 6:
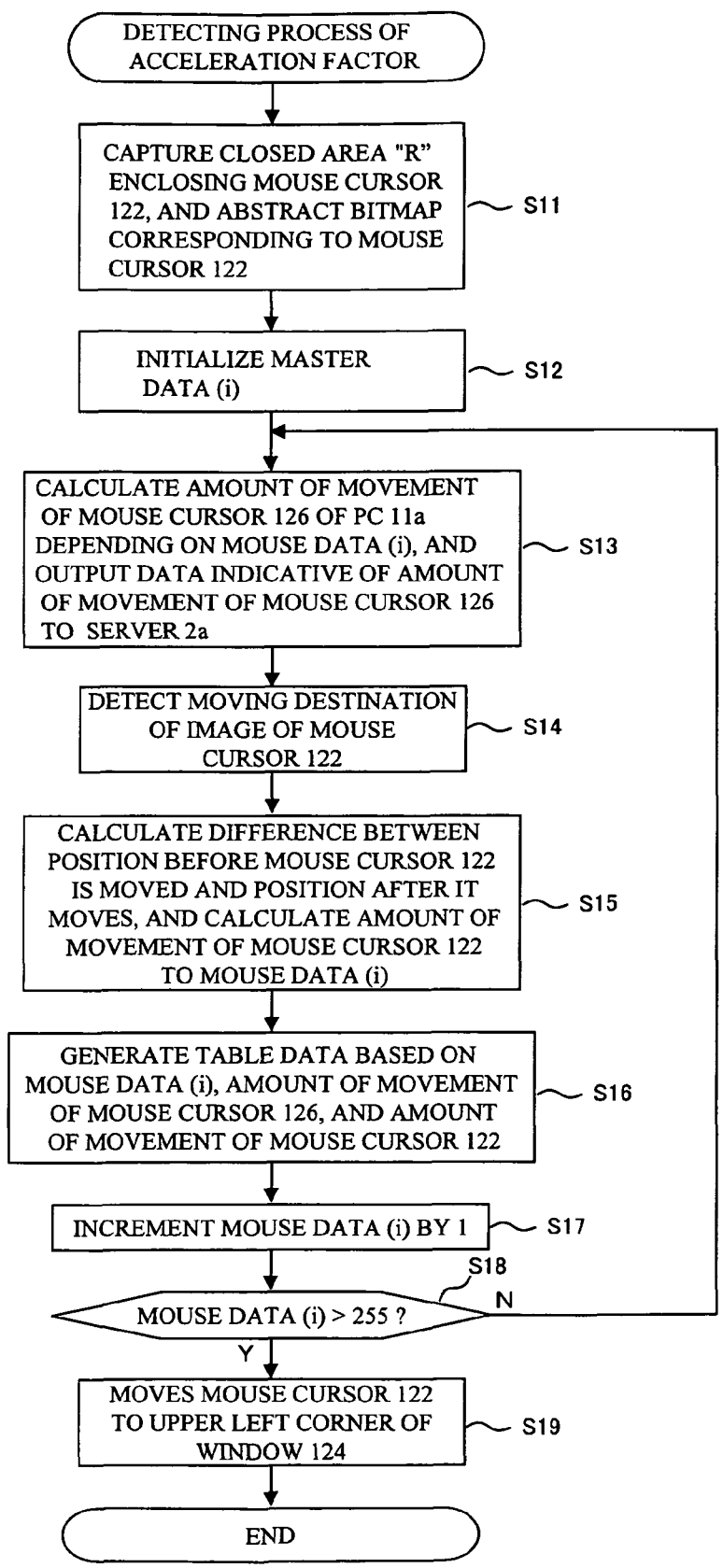
FIG. 6 is a flowchart showing a detecting process of an acceleration factor of step S3 in FIG. 5A.

FIG. 6 is a flowchart showing the detecting process of the acceleration factor of step S3 in FIG. 5A.

First, when the mouse cursor 122 of the server 2*a* is at the position "b", and the mouse cursor 126 of the PC is at the position "B", the CPU 31 of the PC 11*a* captures an closed area "r" enclosing the mouse cursor 122 in FIG. 4B on an image area displayed on the window 124, and abstracts a bitmap corresponding to the mouse cursor 122 of the server 2*a* (step S11) to pursue movement of the mouse cursor 122 of the server 2*a* inside the window 124.

In the following process, the CPU 31 of the PC 11*a* outputs data indicative of the amount of movement of the mouse cursor 126 of the PC 11*a* according to each of pieces of mouse data from 1 to 255 to the server 2*a*, detects how the mouse cursor 122 of the server 2*a* moves depending on the data, and detects the acceleration factor of the server 2*a*.

The CPU 31 of the PC 11*a* initializes mouse data (i), i.e., sets "1" as the master data (i=1) (step S12). Next, the CPU 31 of the PC 11*a* calculates the amount of movement of the mouse cursor 126 of the PC 11*a* depending on the set mouse data (i), and outputs the data indicative of the amount of movement of the mouse cursor 126 of the PC 11*a* to the server 2a (step S13). As a result, the mouse cursor 122 of the server 2a inside the window 124 moves.

Next, the CPU 31 of the PC 11a detects a moving destination in the window 124 of the image of the mouse cursor 122 of the server 2a by pattern matching (step S14).

The CPU 31 of the PC 11a calculates a difference between a position before the mouse cursor 122 of the server 2a is moved and a position after it moves, and calculates an amount of movement of the mouse cursor 122 of the server 2a to the mouse data (i) (Step S15). The calculation of the amount of movement is repeated for the number of times corresponding to the mouse data (1-255) to which the mouse 14a can output, i.e., 255 times according to a loop of steps S13 to S18.

The CPU 31 of the PC 11a generates table data based on the mouse data (i), the amount of movement of the mouse cursor 126 of the PC 11a, and the amount of movement of the mouse cursor 122 of the server 2a (step S16). The generated table data is stored into the HDD 34. The table data will be described later.

Continuously, the CPU 31 of the PC 11a increments the mouse data (i) by 1 (step S17), and determines whether the mouse data (i) exceeds 255 (step S18).

When the mouse data (i) do not exceed 255 (NO), the procedure returns to step S13. On the other hand, when the mouse data (i) exceeds 255 (YES), the CPU 31 of the PC 11a moves the mouse cursor 122 of the server 2a to the upper left corner of the window 124 (step S19). The procedure is terminated.

The detecting process of the acceleration factor of step S3-1 in FIG. 5B is executed in the same manner as FIG. 6, but the execution subject is the controller 101 of the KVM switch 1. In this case, the controller 101 of the KVM switch 1 continuously receives data of the screen of the PC 11a.

FIG. 7A is a diagram showing an example of table data generated by step S16, FIG. 7B is a diagram showing an example of table data in which each value in FIG. 7A is rounded off, and FIG. 7C is a diagram showing an example of table data which makes the position of the mouse cursor 126 of the PC 11a and the position of the mouse cursor 122 of the server 2a coincide with each other.

In FIG. 7A, a sign "X" denotes mouse data corresponding to an input to the PC 11a, a sign "Y" denotes the amount of movement of the mouse cursor 126 of the PC 11a, and a sign "Z" denotes the amount of movement of the mouse cursor 122 of the server 2a. By step S16 described above, the CPU 31 of the PC 11a generates the table data in FIG. 7A, and table data in FIG. 7B in which each value in FIG. 7A is rounded off at the same time. Table data in FIG. 7C is generated by the CPU 31 of the PC 11a in step S19, and stored into the HDD 34, or the table data in FIG. 7C is generated by the controller 101 of the KVM switch 1, and stored into the memory 105.

To detect the acceleration factor of the server 2a, the mouse data X in FIGS. 7A and 7B is used, and the amount Y of movement of the mouse cursor 126 of the PC 11a shown in FIGS. 7A and 7B is input to the server 2a. The reason why the mouse data X is different from the amount Y of movement of the mouse cursor 126 of the PC 11a is that the acceleration process of the mouse is executed in the PC 11a.

It is required that the position of the mouse cursor 122 of the server 2a and the position of the mouse cursor 126 of the PC 11a coincide with each other so that the position of the mouse cursor 122 of the server 2a does not deviate from the position of the mouse cursor 126 of the PC 11a. However, it is clear in FIG. 7B that the amount Z of movement of the mouse cursor 122 of the server 2a does not coincide with the amount Y of movement of the mouse cursor 126 of the PC 11a.

In the present embodiment, the CPU 31 of the PC 11a or the controller 101 of the KVM switch 1 execute a output converting process which converts the output of the amount Y of movement of the mouse cursor 126 of the PC 11a such that the amount Z of movement of the mouse cursor 122 of the server 2a and the amount Y of movement of the mouse cursor 126 of the PC 11a coincide with each other. Specifically, in the output converting process, the CPU 31 of the PC 11a or the controller 101 of the KVM switch 1 outputs one or more mouse data to the server 2a such that the amount Z of movement of the mouse cursor 122 of the server 2a and the amount Y of movement of the mouse cursor 126 of the PC 11a coincide with each other. The one or more mouse data is data, in which the acceleration process is not executed by the PC 11a, which is directly input from the mouse to the PC 11a.

The table data in FIG. 7C shows a relationship between the amount Y of movement of the mouse cursor 126 of the PC 11a, the mouse data output to the server 2a, and the amount Z of movement of the mouse cursor 122 of the server 2a.

For example, when the amount Y of movement of the mouse cursor 126 of the PC 11a is equal to "5", and the value "5" is output from the PC 11a to the server 2a, the amount Z of movement of the mouse cursor 122 of the server 2a becomes "7" based on FIG. 7B. Therefore, the mouse cursor 122 is accelerated for "2". In this case, the amount Y of movement of the mouse cursor 126 of the PC 11a and the amount Z of movement of the mouse cursor 122 of the server 2a do not coincide with each other.

However, when the amount Y of movement of the mouse cursor 126 of the PC 11a is equal to "5" in FIG. 7C, "3" as mouse data X-1 and "1" as mouse data X-2 are output from the PC 11a to the server 2a. That is, the mouse data is divided into twice, and it is output. When the mouse data is equal to "3", the amount Z-1 of movement of the mouse cursor 122 of the server 2a becomes "4" based on FIG. 7B. When the mouse data is equal to "1", the amount Z-2 of movement of the mouse cursor 122 of the server 2a becomes "1" based on FIG. 7B. The amount Z of movement of the mouse cursor 122 which is the total of the amount Z-1 of movement and the amount Z-2 of movement becomes "5". In this case, the amount Y of movement of the mouse cursor 126 of the PC 11a and the amount Z of movement of the mouse cursor 122 of the server 2a coincide with each other.

Figure 8A:
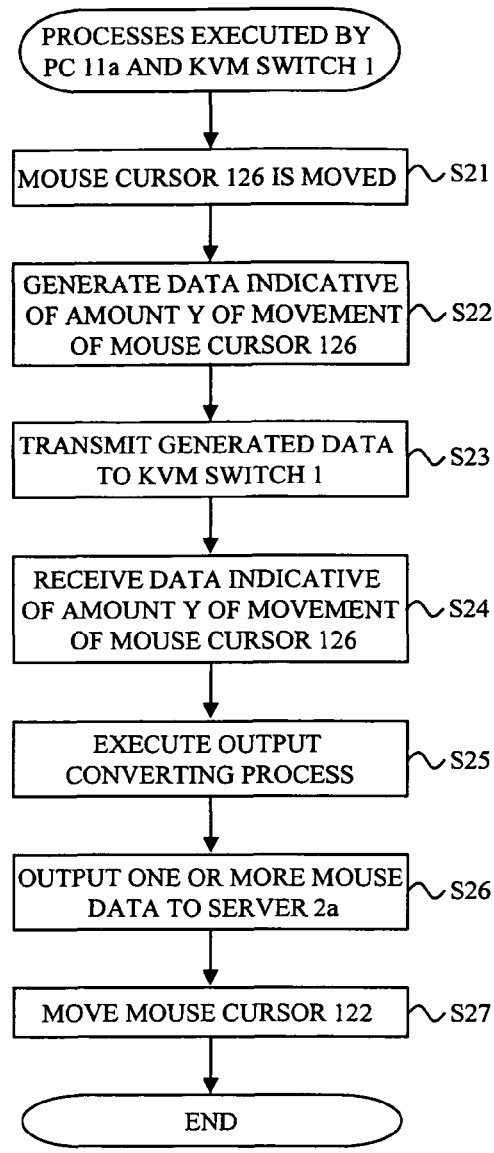
FIGS. 8A and 8B are flowcharts showing processes executed by the PC 11a and the KVM switch 1.
Figure 8B:
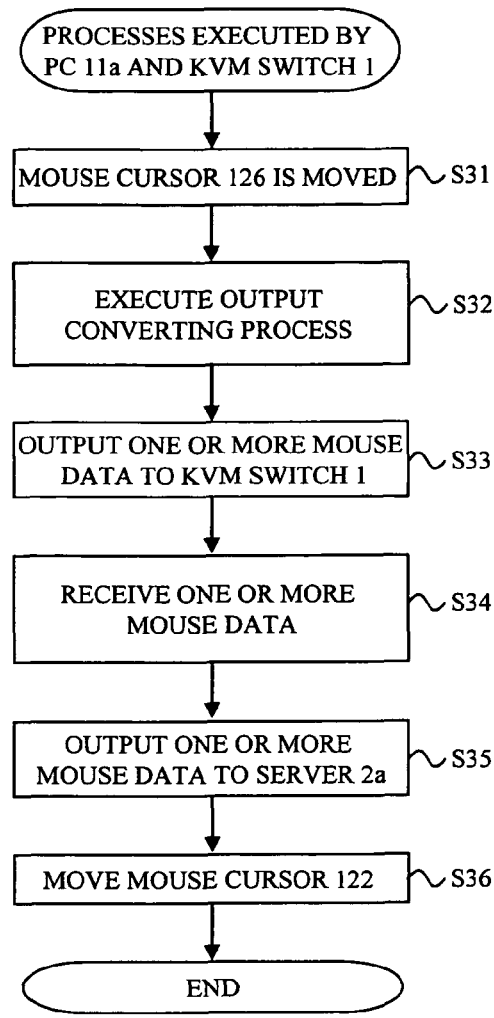

FIGS. 8A and 8B are flowcharts showing processes executed by the PC 11a and the KVM switch 1.

First, a description will now be given of the process in FIG. 8A.

When the mouse 14a is operated in the PC 11a, and the mouse cursor 126 of the PC 11a is moved (step S21), the CPU 31 of the PC 11a generates data indicative of the amount Y of movement of the mouse cursor 126 of the PC 11a (step S22), and transmits the data to the KVM switch 1 (step S23). The controller 101 of the KVM switch 1 receives the data indicative of the amount Y of movement of the mouse cursor 126 of the PC 11a (step S24), executes the output converting process with the table data in FIG. 7C (step S25), and outputs one or more mouse data to the server 2a (step S26). The server 2a receives the one or more mouse data, and moves the mouse cursor 122 of the server 2a (step S27). The procedure is terminated. The movement of the mouse cursor 122 of the server 2a is displayed on the window 124 of the PC 11a.

Next, a description will now be given of the process in FIG. 8B.

When the mouse 14a is operated in the PC 11a, and the mouse cursor 126 of the PC 11a is moved (step S31), the CPU 31 of the PC 11a executes the output converting process with the table data in FIG. 7C (step S32), and outputs one or more mouse data to the KVM switch 1 (step S33). The controller 101 of the KVM switch 1 receives the one or more mouse data (step S34), and directly outputs the one or more mouse data to the server 2a (step S35). The server 2a receives the one or more mouse data, and moves the mouse cursor 122 of the server 2a (step S36). The procedure is terminated. The movement of the mouse cursor 122 of the server 2a is displayed on the window 124 of the PC 11a.

Thus, the PC 11a or the KVM switch 1 outputs the mouse data in which the position gap between the mouse cursor 126 of the PC 11a and the mouse cursor 122 of the server 2a does not occur, to server 2a, so that it is possible to provide the position gap correcting function which is not controlled by the acceleration process of the mouse of the server 2a, and it is not necessary to invalidate the acceleration process of the mouse of the server as in the prior art. Further, as long as the mouse cursor 126 of the PC 11a is directly above the window 124, the position gap between the mouse cursor 126 of the PC 11a and the mouse cursor 122 of the server 2a does not occur, and hence it is possible to provide a comfortable mouse operating environment for the operator of the mouse 14a.

Next, a description will now be given of a second function which automatically generates the table data to correct the mouse data. Here, the server 2a automatically generates pieces of mouse data in FIGS. 7A to 7C.

In the above-mentioned first embodiment, to generate the pieces of mouse data in FIGS. 7A to 7C, the PC 11a executes the capture of the image of the mouse cursor 122 of the server 2a in the window 124 and the pattern matching process.

How movement of the mouse cursor 126 of the PC 11a is reflected on the server 2a, i.e., how the mouse cursor 122 of the server 2a is moved according to movement of the mouse cursor 126 of the PC 11a can be examined by operating a monitoring program on the server 2a, and always detecting the position of the mouse cursor 122 of the server 2a.

Figure 9A:
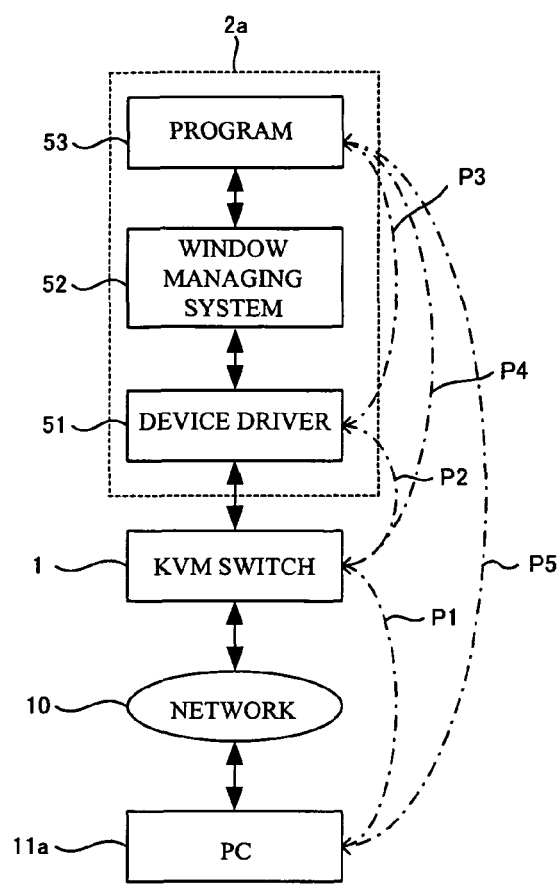
FIG. 9A is a diagram in which a process route of data in the PC 11a, the KVM switch 1, and the server 2a is modeled.

FIG. 9A is a diagram in which a process route of data in the PC 11a, the KVM switch 1, and the server 2a is modeled.

The HDD 24 of the server 2a includes a device driver 51, window managing system 52, and a program 53. These are read out from the HDD 24 to the RAM 23, and are arbitrarily executed by the CPU 21 to thereby exert the respective functions.

In FIG. 9A, a route P1 denotes using an I/F (e.g. an Ethernet or a telephone communication) between the KVM switch 1 and the PC 11a. A route P2 denotes using an I/F (e.g. a communication line for PS2, or USB) between the device driver 51 and the KVM switch 1 which is hardware. A route P3 denotes using an I/F (e.g. Application Program Interface) between the program 53 and the device driver 51. A route P4 denotes using an I/F (e.g. an Ethernet and TCP/IP) between the program 53 and the KVM switch 1 when the server 2a and the KVM switch 1 are connected to a communication route which is connectable to them. A route P5 denotes using an I/F (e.g. an Ethernet and TCP/IP) between the program 53 and the PC 11a when the server 2a and the PC 11a are connected to a communication route which is connectable to them.

A description will now be given of operations of the PC 11a, the KVM switch 1, and the server 2a.

The data indicative of the amount Y of movement of the mouse cursor 126 of the PC 11a (see FIG. 7B) is notified from the PC 11a to the KVM switch 1 via the network 10. KVM switch 1 plays a role as the mouse for the server 2a, inputs the data notified from the PC 11a to the server 2a, and sends it to the device driver 51.

At the time point when the data indicative of the amount Y of movement of the mouse cursor 126 has been sent, the acceleration process of the server 2a is not executed, and the data indicative of the amount Y of movement of the mouse cursor 126 is a value shown in FIG. 7B.

The device driver 51 sends the data indicative of the amount Y of movement of the mouse cursor 126 to the window managing system 52. The window managing system 52 executes the acceleration process, and sends the data after the acceleration process to the program 53. The acceleration process is executed to the data which is sent to the program 53, and therefore the data becomes data indicative of the amount Z of movement of the mouse cursor 122 of the server 2a in FIG. 7B. The CPU 21 moves the mouse cursor 122 of the server 2a according to the amount Z of movement of the mouse cursor 122 of the server 2a in which the acceleration process is executed.

Thus, the data indicative of the amount Y of movement of the mouse cursor 126 of the PC 11a input to the server 2a is acquired by the device driver 51, and the data indicative of the amount Z of movement of the mouse cursor 122 of the server 2a is acquired by the program 53. The mouse data sequentially increases one by one as described later, so that the device driver 51 can determine that mouse data corresponding to the data which is first received and is indicative of the amount Y of movement of the mouse cursor 126 of the PC 11a is "1", mouse data corresponding to the data which is secondly received and is indicative of the amount Y of movement of the mouse cursor 126 of the PC 11a is "2", and mouse data corresponding to the data which is final received and is indicative of the amount Y of movement of the mouse cursor 126 of the PC 11a is "255". That is, the device driver 51 receives the data indicative of the amount Y of movement of the mouse cursor 126 of the PC 11a to thereby acquire a value of the mouse data corresponding to the received data.

By acquiring the data indicative of the amount Z of movement of the mouse cursor 122 of the server 2a from the program 53, the device driver 51 can generate the table data in FIG. 7B and the table data in FIG. 7C based on the data which is acquired in advance and is indicative of the amount Y of movement of the mouse cursor 126 of the PC 11a, the mouse data, and the data indicative of the amount Z of movement of the mouse cursor 122 of the server 2a.

Figure 9B:
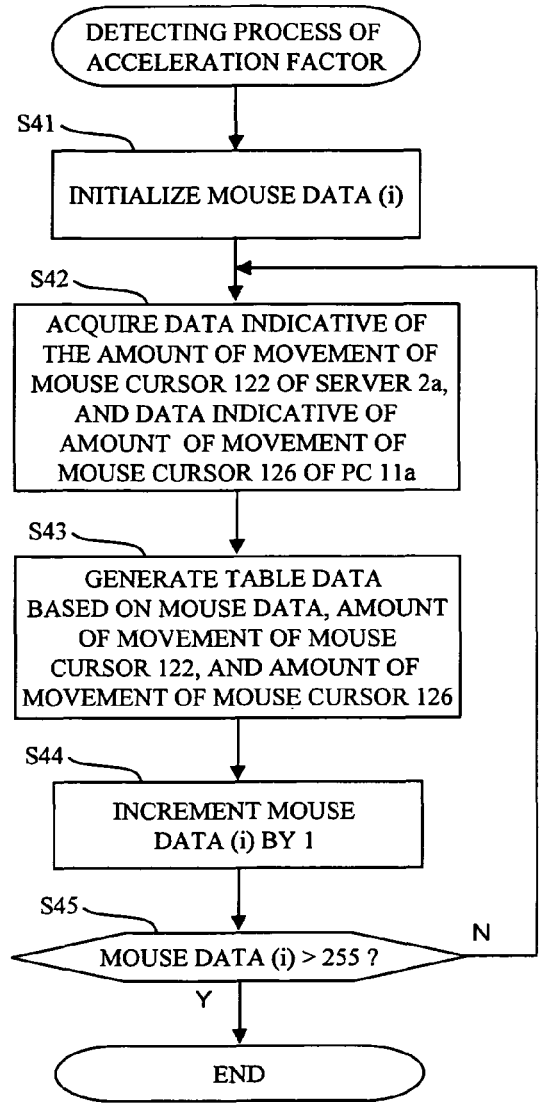
FIG. 9B is a flowchart showing a detecting process of an acceleration factor.

FIG. 9B is a flowchart showing the detecting process of the acceleration factor.

The device driver 51 initializes the mouse data (i), i.e., set "1" as the mouse data (i=1) (step S41). Next, the device driver 51 acquires the data indicative of the amount Z of movement of the mouse cursor 122 of the server 2a from the program 53, and the data indicative of the amount Y of movement of the mouse cursor 126 of the PC 11a from the KVM switch 1 (step S42). The device driver 51 generates the table data based on the mouse data, the amount Z of movement of the mouse cursor 122 of the server 2a, and the amount Y of movement of the mouse cursor 126 of the PC 11a (step S43). The table data is in FIG. 7A. The device driver 51 rounds off each value of the mouse data, the amount Z of movement of the mouse cursor 122 of the server 2a, and the amount Y of movement of the mouse cursor 126 of the PC 11a to acquire the table data in FIG. 7B.

Next, the device driver 51 increments the mouse data (i) by 1 (step S44), and determines whether the mouse data (i) exceeds 255 (step S45).

When the mouse data (i) do not exceed 255 in step S45 (NO), the procedure returns to step S42. On the other hand, when the mouse data (i) exceeds 255 in step S45 (YES), the procedure is terminated. After the present process, the device driver 51 generates the table data in FIG. 7C based on the table data in FIG. 7B.

In the above-mentioned process, the device driver 51 generates the pieces of table data in FIGS. 7A to 7C. However, the amount Y of movement of the mouse cursor 126 of the PC 11a and the mouse data are also acquired by the KVM switch 1 and the PC 11a, and the KVM switch 1 or the PC 11a therefore may generate the pieces of table data in FIGS. 7A to 7C by transferring the data indicative of the amount Z of movement of the mouse cursor 122 of the server 2a to the KVM switch 1 or the PC 11a with the route P1 or the route P2.

The KVM switch 1 may acquire the data indicative of the amount Z of movement of the mouse cursor 122 of the server 2a from the program 53, and generate the pieces of table data in FIGS. 7A to 7C. Further, the KVM switch 1 may store the pieces of table data thereinto, or may transfer the pieces of table data to the device driver 51 or the PC 11a. The PC 11a may acquire the data indicative of the amount Z of movement of the mouse cursor 122 of the server 2a from the program 53, and generate the pieces of table data in FIGS. 7A to 7C. Further, the PC 11a may store the pieces of table data thereinto, or may transfer the pieces of table data to the device driver 51 or the KVM switch 1.

Thus, the generation of the pieces of table data in FIGS. 7A to 7C is executable by any one of the PC 11a, the KVM switch 1, and the device driver 51. Moreover, the output converting process executed based on the table data in FIG. 7C has to be executed by a preceding stage of the window managing system 52. The output converting process represents a process in which one or more mouse data is output to the server 2a (specifically, the program 53) such that the amount Y of movement of the mouse cursor 126 of the PC 11a and the amount Z of movement of the mouse cursor 122 of the server 2a coincide with each other. In the server 2a, the device driver 51 executes the output converting process based on the table data in FIG. 7C.

Next, a description will now be given of the case where the detecting process of the acceleration factor is semiautomatically executed. The semiautomatic means that the operation by the operator of the PC 11a is necessary.

Figure 10:
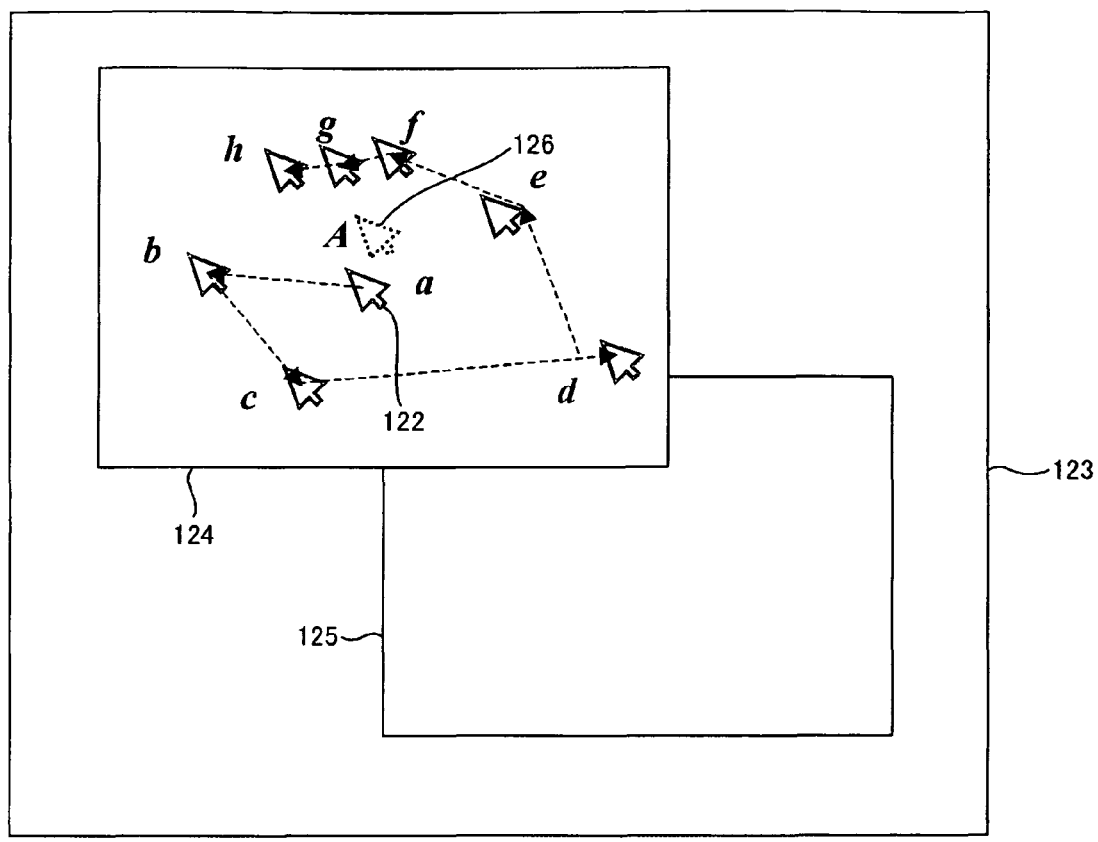

FIG. 10 is a diagram showing an example of the screen of the PC 11a.

In FIG. 10, reference numeral 123 denotes a screen of the PC 11a, and reference numeral 126 denotes a mouse cursor of the PC 11a. Reference numeral 124 denotes a window displayed on a screen of the server 2a, and reference numeral 125 denotes another window. On the window 124, the mouse cursor 122 of the server 2a is displayed, and the mouse cursor of the PC 11a is also displayed. However, the mouse cursor of the PC 11a is displayed only at this process, and the mouse cursor of PC 11a is usually set to non-display on the window 124.

In FIG. 10, the position "A" of the mouse cursor 126 of the PC 11a and the position "a" of the mouse cursor 122 of the server 2a may be at any positions in an initial state. However, the CPU 31 of the PC 11a stores the coordinates of the position "A" of the mouse cursor 126 of the PC 11a and the coordinates of the position "a" of the mouse cursor 122 of the server 2a into the HDD 34 in advance.

First, the CPU 31 of the PC 11a outputs data which moves the mouse cursor 122 of the server 2a to the server 2a, so that the CPU 31 of the PC 11a moves the mouse cursor 122 of the server 2a from the position "a" to the position "b". The operator of the PC 11a moves the mouse cursor 126 of the PC 11a, and clicks the arrowhead of the mouse cursor 122 of the server 2a at the position "b". By the click, the CPU 31 of the PC 11a can recognize that the position "b" of the mouse cursor 122 of the server 2a and the position of the mouse cursor 126 of the PC 11a are the same as each other. At this time, the CPU 31 of the PC 11a does not output the data indicative of the amount of movement of the mouse cursor 126 of the PC 11a to the server 2a. This is because, if the data indicative of the amount of movement of the mouse cursor 126 of the PC 11a is output to the server, the mouse cursor 122 of the server 2a is moved in response to the movement of the mouse cursor 126 of the PC 11a, and the operator therefore cannot click the mouse.

Next, the CPU 31 of the PC 11a further outputs data which moves the mouse cursor 122 of the server 2a to the server 2a. When the mouse cursor 122 of the server 2a is moved from the position "b" to the position "c", the operator of the PC 11a moves the mouse cursor 126 of the PC 11a, and clicks the arrowhead of the mouse cursor 122 of the server 2a at the position "c".

Therefore, the CPU 31 of the PC 11a recognizes how the acceleration process has been done with the server 2a for the data which has moved the mouse cursor 122 of the server 2a from the position "b" to the position "c", and has output from the CPU 31 of the PC 11a. As a result, the CPU 31 of the PC 11a can decide a relationship between the amount of movement from the position "b" to the position "c" of the mouse cursor 126 of the PC 11a and the amount of movement from the position "b" to the position "c" of the mouse cursor 122 of the server 2a.

Thus, when the mouse cursor 122 of the server 2a is sequentially moved from the position "a" to the position "h", the operator of the PC 11a moves the mouse cursor 126 of the PC 11a depending on the movement of the mouse cursor 122 of the server 2a, and clicks the arrowhead of the mouse cursor 122 of the server 2a. As a result, the CPU 31 of the PC 11a can decide the relationship between the amount of movement of the mouse cursor 126 of the PC 11a and the amount of movement of the mouse cursor 122 of the server 2a.

Figure 11:
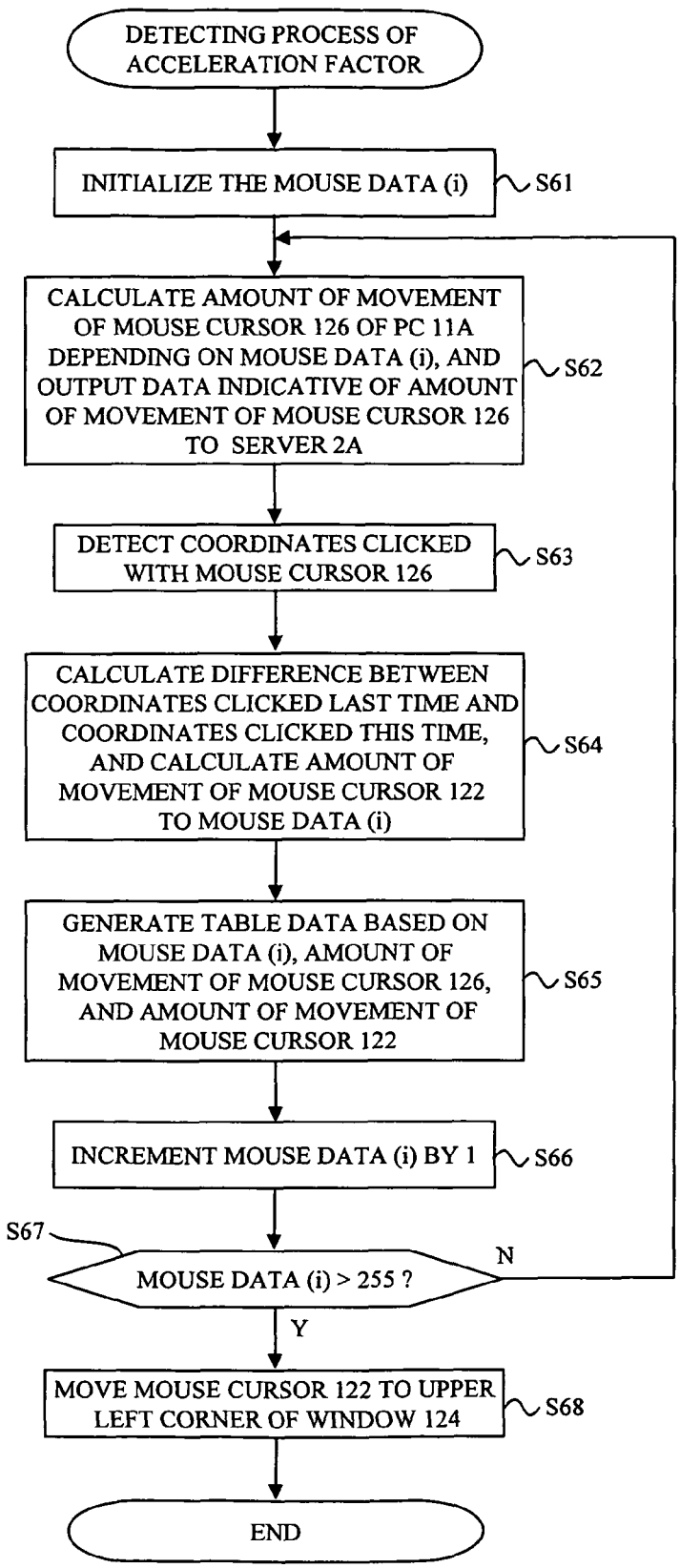
FIG. 11 is a flowchart showing in the case where the detecting process of the acceleration factor is semiautomatically executed.

FIG. 11 is a flowchart showing in the case where the detecting process of the acceleration factor is semiautomatically executed.

First, the CPU 31 of the PC 11a initializes the mouse data (i), i.e., sets "1" as the mouse data (i=1) (step S61). Next, the CPU 31 of the PC 11a calculates the amount of movement of the mouse cursor 126 of the PC 11a depending on the set mouse data (i), and outputs the data indicative of the amount of movement of the mouse cursor 126 of the PC 11a to the server 2a (step S62). As a result, the mouse cursor 122 of the server 2a inside the window 124 moves.

Next, the CPU 31 of the PC 11a detects coordinates clicked with the mouse cursor 126 of the PC 11a by the operator of the PC 11a (step S63).

The CPU 31 of the PC 11a calculates a difference between coordinates clicked last time and coordinates clicked this time, and calculates the amount of movement of the mouse cursor 122 of the server 2a to the mouse data (i) (step S64). The calculation of the amount of movement is repeated for the number of times corresponding to the mouse data (1-255) to which the mouse 14a can output, i.e., 255 times according to a loop of steps S62 to S67.

The CPU 31 of the PC 11a generates table data based on the mouse data (i), the amount of movement of the mouse cursor 126 of the PC 11a, and the amount of movement of the mouse cursor 122 of the server 2a (step S65). The generated table data is stored into the HDD 34. The generated table data in step S65 is shown in FIGS. 7A and 7B.

Continuously, the CPU 31 of the PC 11a increments the mouse data (i) by 1 (step S66), and determines whether the mouse data (i) exceeds 255 (step S67).

When the mouse data (i) do not exceed 255 in step S67 (NO), the procedure returns to step S62. On the other hand, when the mouse data (i) exceeds 255 in step S67 (YES), the CPU 31 of the PC 11*a* moves the mouse cursor 122 of the server 2*a* to the upper left corner of the window 124 (step S68). The procedure is terminated. After the present process, the CPU 31 of the PC 11*a* generates the table data in FIG. 7C based on the table data in FIG. 7B.

The function which semiautomatically executes the detection process of the acceleration factor is effective when the CPU 31 of the PC 11*a* cannot capture the closed area "r" enclosing the mouse cursor 122 of the server 2*a* on the image area displayed on the window 124. This includes the following reason. That is, although it is common that the shape of the cursor used by the operating system or the window system of the PC 11*a* is an arrow as shown in FIG. 10, there is the case where the shape of the mouse cursor such as not the arrow but a finger or a point may not by decided by the preference of the operator of the server 2*a*. Even in such a situation, the arrowhead of the mouse cursor 122 of the server 2*a* is clicked by the operator of the PC 11*a*, so that the coordinates of the mouse cursor 122 of the server 2*a* can be specified. Thus, the table data in FIG. 7C can be also generated with the function which semiautomatically executes the detection process of the acceleration factor.

The output converting process using the table data in FIG. 7C has to be executed by a preceding stage of the window managing system 52.

Second Embodiment

Figure 20:
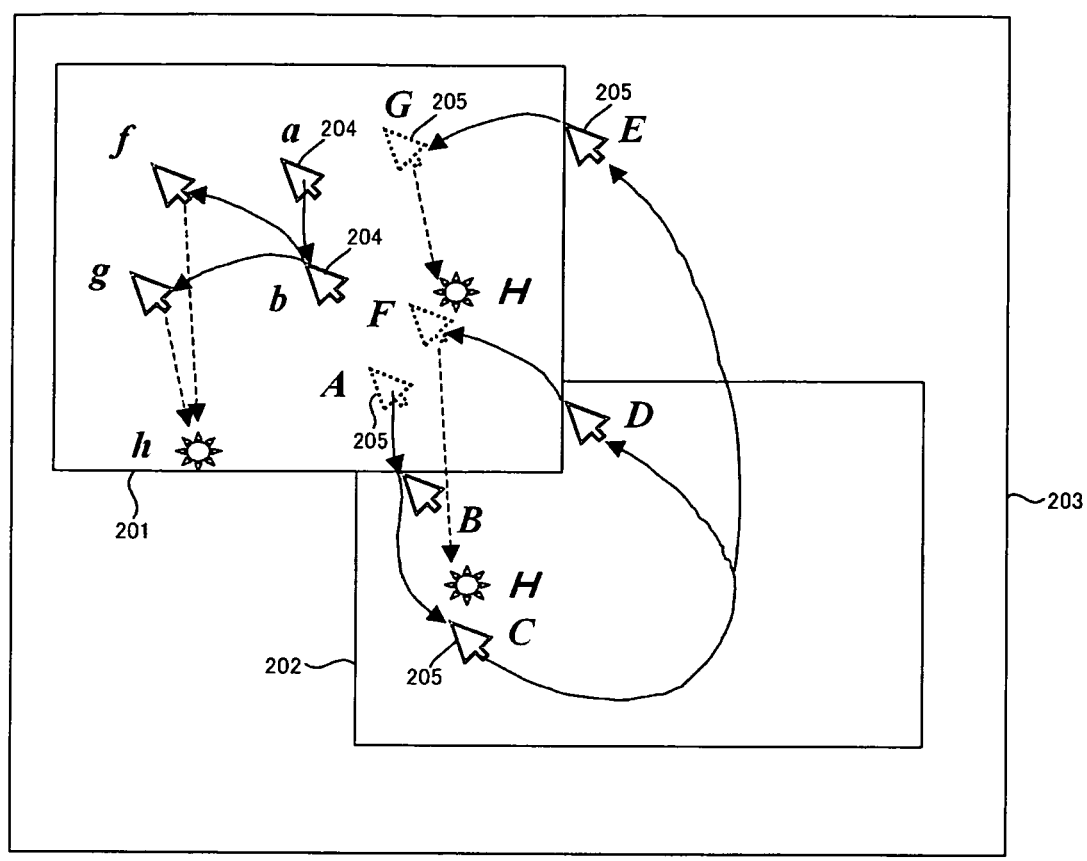
FIG. 20 is a diagram showing an example of the screen of the conventional remote PC.
Figure 21B:
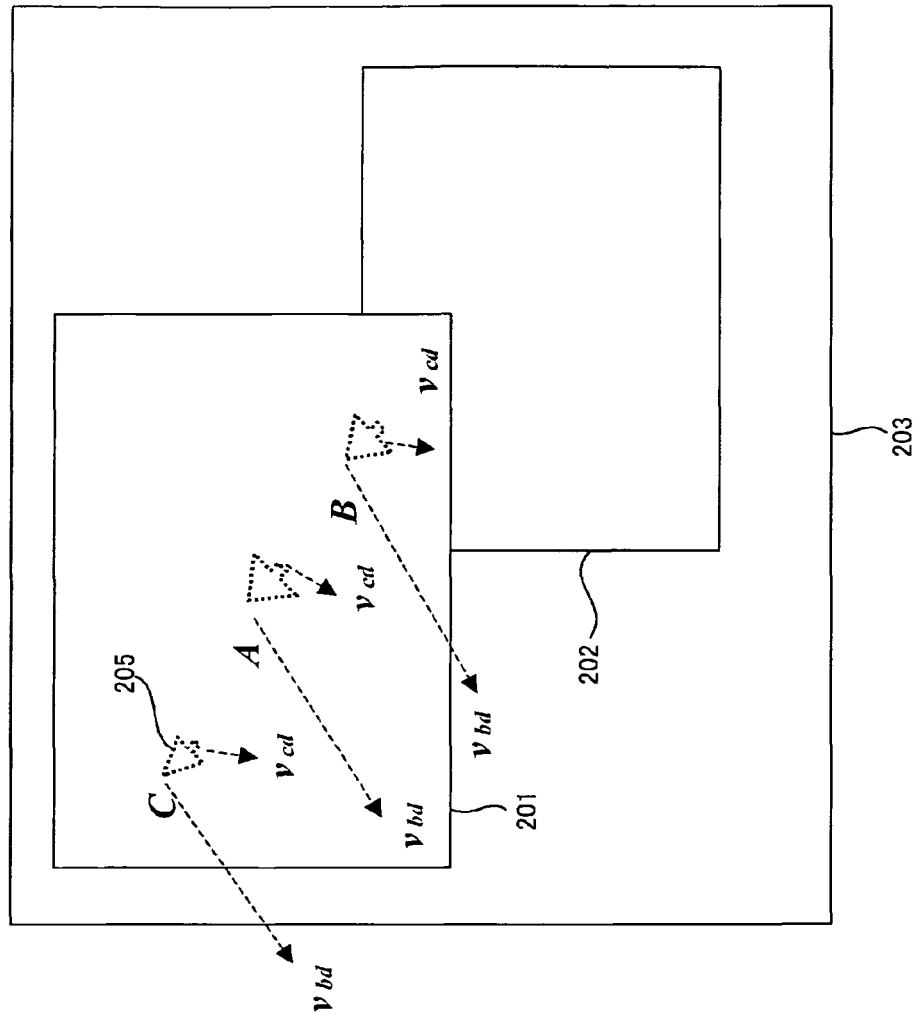
FIG. 21B is a diagram showing an example of the screen of the conventional remote.
Figure 21A:
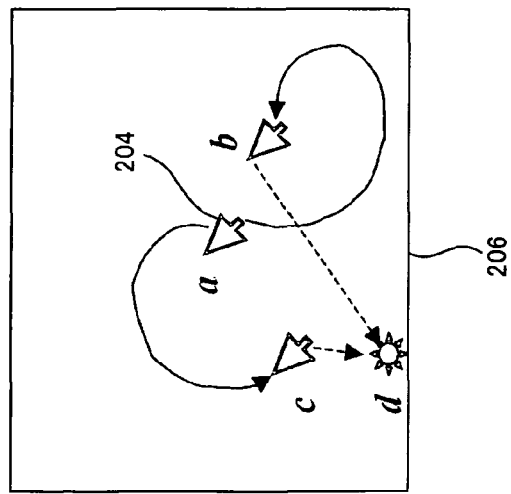
FIG. 21A is a diagram showing an example of the screen of the conventional local.
Figure 22:
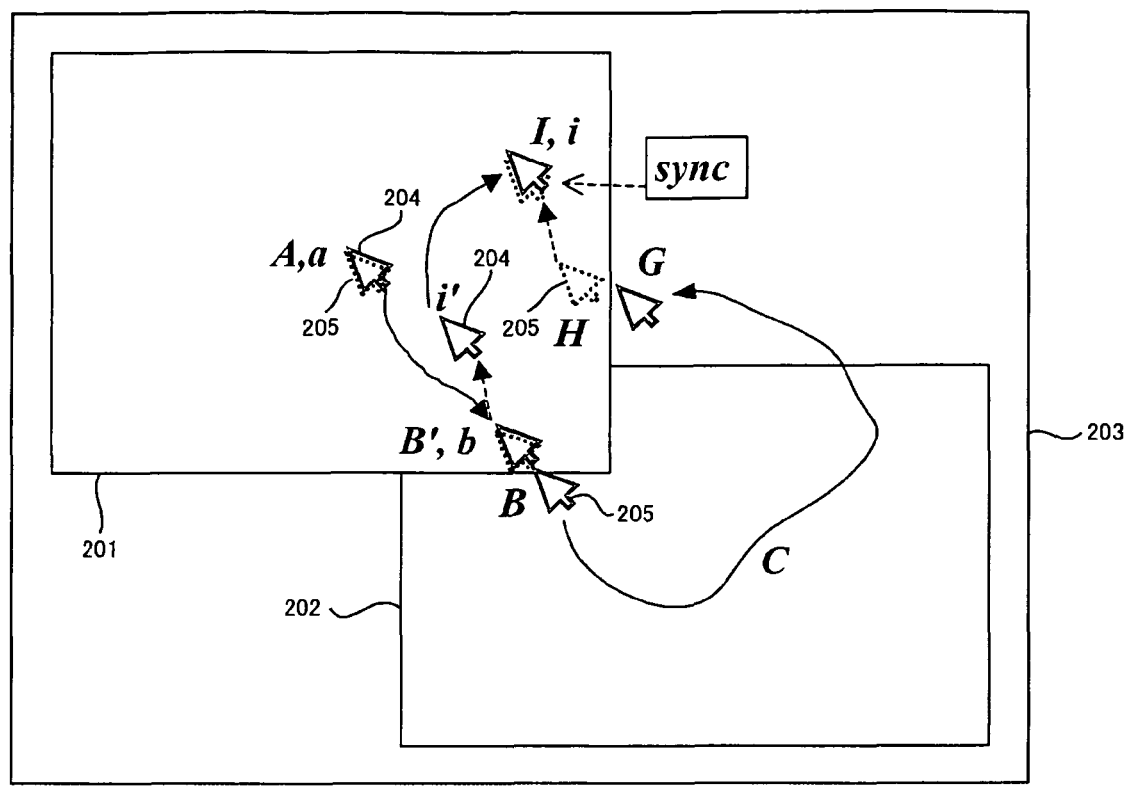
FIG. 22 is a diagram showing an example of the screen of the conventional remote PC.

As described above with reference to the problem 2, even if the mouse cursor 205 of the remote PC (corresponding to the PC 11) is set to non-display, it is impossible to remote-control the server when the mouse cursor 205 of the remote PC exceeds the frame of the window 201 in FIG. 20.

In the present embodiment, a process which limits a moving range of the mouse cursor 126 of the PC 11*a*, and a process which enables the selection of validity or invalidity of the process which limits the moving range are added to the preceding stage of the process executed by the PC 11*a* and the KVM switch 1 in FIG. 8A or 8B described above.

A KVM system according to the present embodiment has the same construction as the KVM system 1000 according to the first embodiment.

Figure 12A:
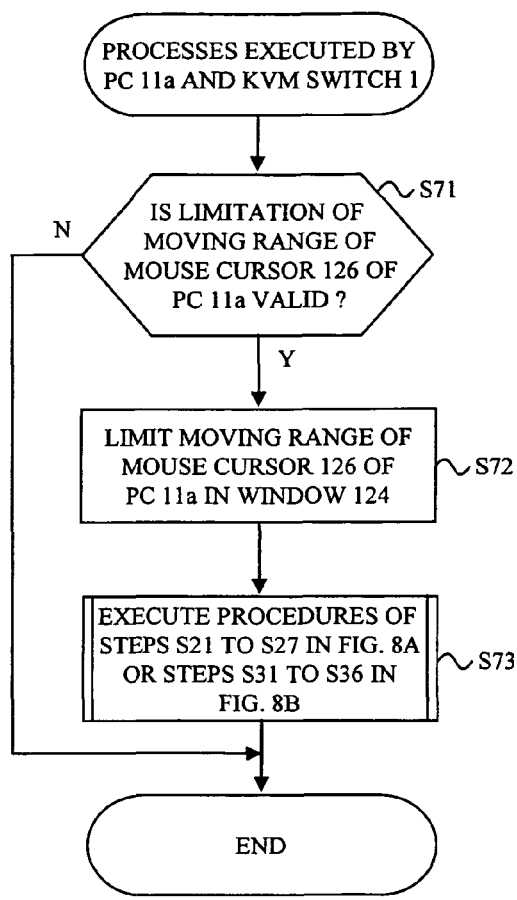
FIG. 12A is a flowchart showing processes executed by the PC 11a and the KVM switch 1 according to a second embodiment of the present invention.

FIG. 12A is a flowchart showing processes executed by the PC 11*a* and the KVM switch 1 according to the second embodiment of the present invention.

The CPU 31 of the PC 11*a* determines whether the limitation of the moving range of the mouse cursor 126 of the PC 11*a* is valid (step S71). Specifically, the CPU 31 of the PC 11*a* determines whether a function key of the keyboard 13*a* to which an instruction to limit the moving range of the mouse cursor 126 of the PC 11*a* is assigned is depressed, or a menu which limits the moving range of the mouse cursor 126 of the PC 11*a* is selected. When the function key is depressed or the menu is selected, the CPU 31 of the PC 11*a* determines that the limitation of the moving range of the mouse cursor 126 of the PC 11*a* is valid. When the function key is not depressed or the menu is not selected, the CPU 31 of the PC 11*a* determines that the limitation of the moving range of the mouse cursor 126 of the PC 11*a* is invalid.

When it is determined in step S71 that the limitation of the moving range of the mouse cursor 126 of the PC 11*a* is valid (YES), the CPU 31 of the PC 11*a* calls up a function which the operating system of the PC 11*a* has, and limits the moving range of the mouse cursor 126 of the PC 11*a* lain window 124 (step S72). The function which the operating system of the PC 11*a* has represents API (Application Program Interface) which is called ClipCursor of Microsoft Windows, for example. In general, the API limits the moving range of the mouse cursor in a square area on the window.

After the procedure of step S72, the procedures of steps S21 to S27 in FIG. 8A described above or steps S31 to S36 in FIG. 8B described above are executed (step S73). Then, the present process is terminated.

On the other hand, when it is determined in step S71 that the limitation of the moving range of the mouse cursor 126 of the PC 11*a* is invalid (NO), the present process is terminated.

Figure 12B:
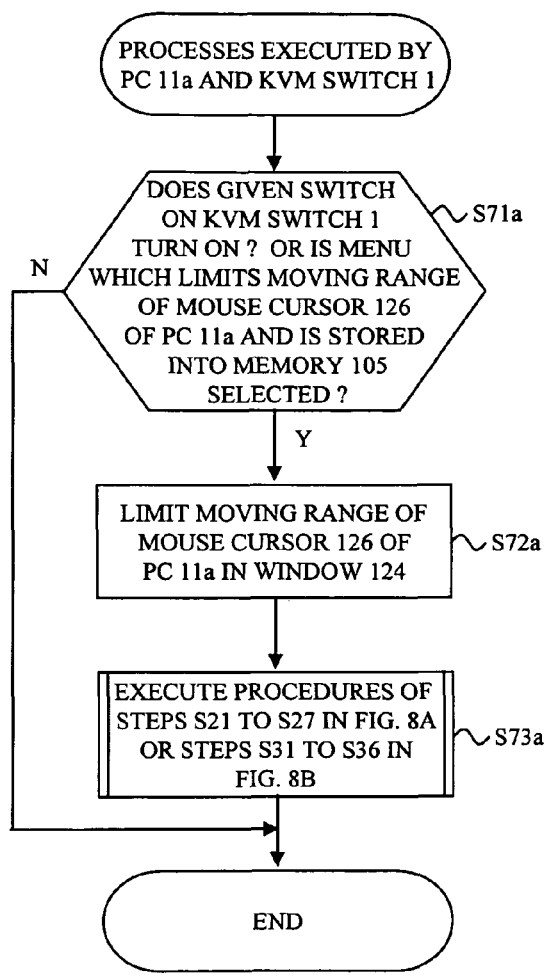
FIG. 12B is a flowchart showing a variation of FIG. 12A.

Although an execution subject of steps S71 and S72 is the CPU 31 of the PC 11*a*, the controller 101 of the KVM switch 1 also can execute the procedures of steps S71 and S72. A process in this case is shown in FIG. 12B.

In step 71*a*, the controller 101 of the KVM switch 1 determines whether a given switch (not shown) on the KVM switch 1 to which an instruction to limit the moving range of the mouse cursor 126 of the PC 11*a* is assigned is turned on, or a menu which limits the moving range of the mouse cursor 126 of the PC 11*a* and is stored into the memory 105 is selected. When the answer to the determination of step S71*a* is "YES", the controller 101 of the KVM switch 1 calls up a function which the operating system of the PC 11*a* has, and limits the moving range of the mouse cursor 126 of the PC 11*a* in window 124 (step S72*a*).

Thus, in the present embodiment, when the moving range of the mouse cursor 126 of the PC 11*a* is limited in window 124, the output converting process is executed. Therefore, when the moving range of the mouse cursor 126 of the PC 11*a* is limited in window 124, the position gap between the mouse cursor 126 of the PC 11*a* and the mouse cursor 122 of the server 2*a* does not occur, and hence it is possible to provide a comfortable mouse operating environment for the operator of the mouse 14*a*.

Third Embodiment

In the present embodiment, a description will now be given of the case where the mouse cursor 122 of the server 2*a* is alternately operated by the remote or the local.

Here, the local indicates the side of server 2*a* and the KVM switch 1, and the remote indicates the side of the PC 11*a*.

In the present embodiment, the pieces of the table data in FIGS. 7B and 7C are stored into the memory 105 of the KVM switch 1 and the HDD 34 of the PC 11*a*. Further, in the present embodiment, it is assumed that an additional process is executed when a mouse operation is executed in the server and the PC 11*a*.

A KVM system according to the present embodiment has the same construction as the KVM system 1000 according to the first embodiment.

A description will now be given, with reference to FIGS. 13A and 13B, of processes executed by the KVM switch 1 and the PC 11*a*.

Figure 13A:
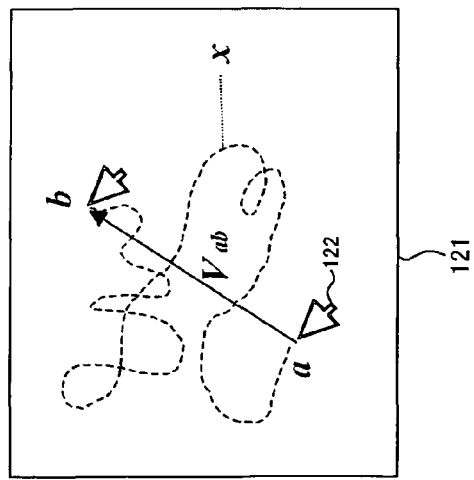
FIG. 13A is a diagram showing the screen of a local (i.e., a side of the server 2a and the KVM switch 1) according to a third embodiment of the present invention.
Figure 13B:
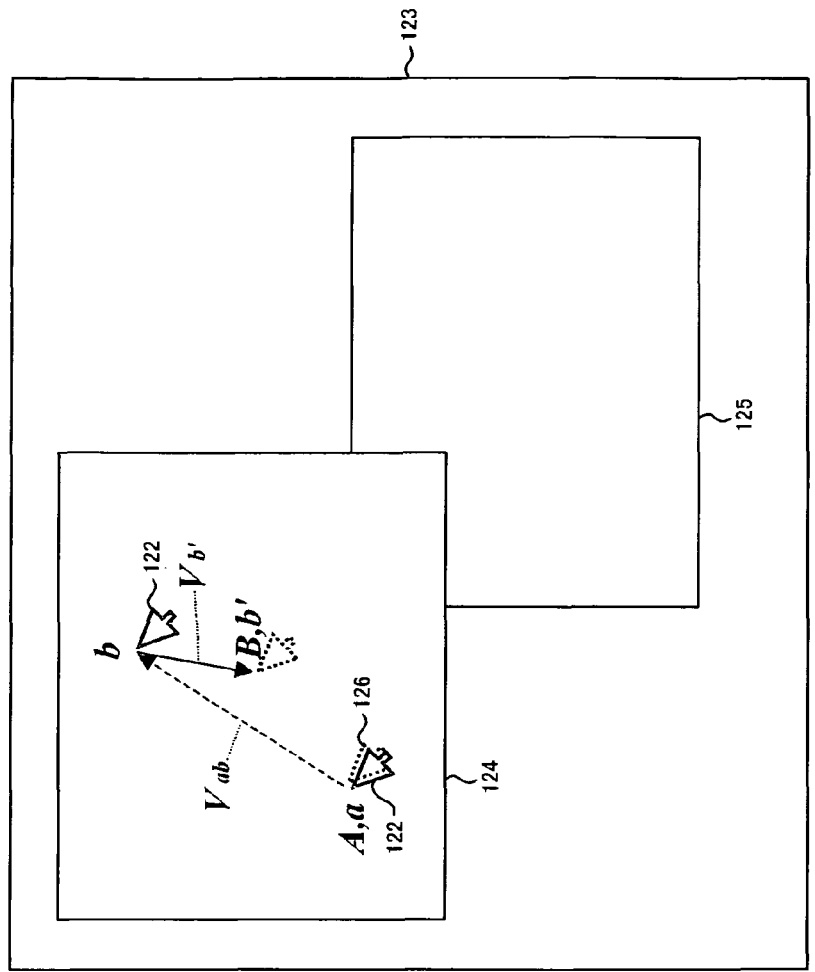
FIG. 13B is a diagram showing the screen of a remote (i.e., a side of the PC 11a) according to the third embodiment of the present invention.

FIG. 13A is a diagram showing a screen of the local (i.e., the side of the server 2*a* and the KVM switch 1), and FIG. 13B is a diagram showing a screen of the remote (i.e., the side of the PC 11*a*).

In FIG. 13A, reference numeral 121 denotes the screen of the local, and reference numeral 122 denotes a mouse cursor of the server 2*a*. In FIG. 13B, reference numeral 123 denotes the screen of the remote, and reference numeral 126 denotes a mouse cursor of the PC 11*a*. Reference numeral 124 denotes a window where non-display of the mouse cursor 126 of the PC 11*a* has been set, and reference numeral 125 denotes another window where display of the mouse cursor has been set. On the window 124, the screen of the local is displayed.

The display or non-display of the mouse cursor in the window 124 and the window 125 can be set by the operating system of the PC 11a.

On the assumption that the position of the mouse cursor 126 of the PC 11a when the mouse operation is changed from the remote to the local is the position "A", the mouse cursor 122 of the server 2a is at the position "a". When the mouse cursor 122 of the server 2a traces a track "x" and moves from the position "a" to the position "b" by the mouse operation of the local, the amount of movement of mouse cursor 122 of server 2a, i.e., the accumulation value of data output from the KVM switch 1 to the server 2a finally becomes "$V_{ab}$".

Here, it is assumed that the position of the mouse cursor 122 of the server 2a when the mouse operation is changed from the local to the remote is the position "b", and the mouse cursor 126 of the PC 11a is at the position "B". When the mouse operation is changed from the local to the remote, and the mouse cursor 126 of the PC 11a moves in any direction by the mouse operation of the remote, the CPU 31 of the PC 11a acquires an amount $V_{ab}$ of movement of the mouse cursor 122 of the server 2a from the server 2a, determines the position "b" from the amount $V_{ab}$ of movement and the coordinates of the position "a", and calculates a difference ($V_b$) between the position "b" and the position "B" of the mouse cursor 126 of the PC 11a. Then, the CPU 31 of the PC 11a combines the amount of movement of the mouse cursor 126 of the PC 11a with the calculated difference ($V_b'$) between the position "b" and the position "B", and outputs one or more mouse data corresponding to the combined value by using the table data in FIG. 7C to the server 2a.

Figure 14A:
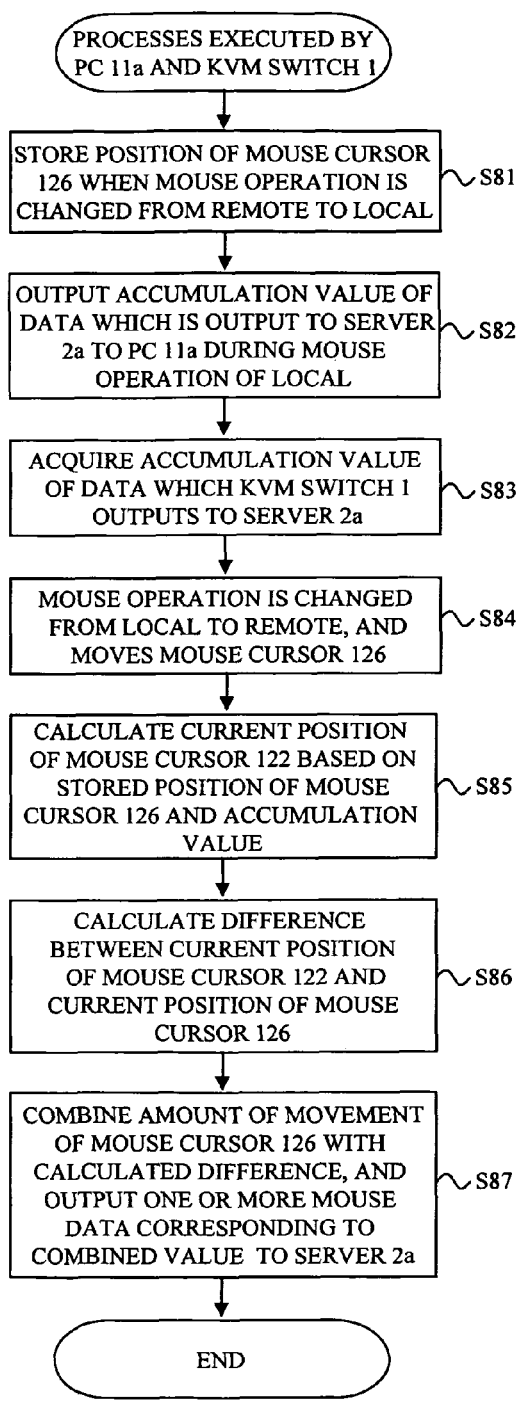
FIG. 14A is a flowchart showing processes executed by the PC 11a and the KVM switch 1 according to the third embodiment of the present invention.

FIG. 14A is a flowchart showing processes executed by the PC 11a and the KVM switch 1 according to the third embodiment of the present invention.

First, the CPU 31 of the PC 11a stores the position of the mouse cursor 126 of the PC 11a when the mouse operation is changed from the remote (the side of the PC 11a) to the local (the side of the server 2a and the KVM switch 1), i.e., the final position of the mouse operation of the remote into the HDD 34 (step S81).

Next, the controller 101 of the KVM switch 1 outputs the accumulation value of data which is output to the server 2a to the PC 11a during the mouse operation of the local (step S82). Here, the data which the KVM switch 1 outputs to the server 2 corresponds to the amount Y of movement of the mouse cursor 126 of the PC 11a in the table data in FIG. 7C.

The CPU 31 of the PC 11a acquires the accumulation value of the data which the KVM switch 1 outputs to the server 2 (step S83). Next, when the mouse operation is changed from the local to the remote, and the mouse cursor 126 of the PC 11a moves in any direction by the mouse operation of the remote (step S84), the CPU 31 of the PC 11a calculates the current position of the mouse cursor 122 of the server 2a based on the final position of the mouse operation of the remote into the HDD 34 and the accumulation value of the data which the KVM switch 1 outputs to the server 2 (step S85). The CPU 31 of the PC 11a calculates a difference between the current position of the mouse cursor 122 of the server 2a and the current position of the mouse cursor 126 of the PC 11a (step S86).

Next, the CPU 31 of the PC 11a combines the amount of movement of the mouse cursor 126 of the PC 11a with the difference calculated in step S86, and outputs one or more mouse data corresponding to the combined value by using the table data in FIG. 7C to the server 2a (step S87). Specifically, the CPU 31 of the PC 11a calculates the amount Y of movement of the mouse cursor 126 of the PC 11a which coincides with the combined value, and outputs one or more mouse data corresponding to the amount Y of movement to the server 2a.

According to the above-mentioned process, when the mouse operation is changed from the local to the remote, the position of the mouse cursor 122 of the server 2a coincides with the position of the mouse cursor 126 of the PC 11a.

Figure 14B:
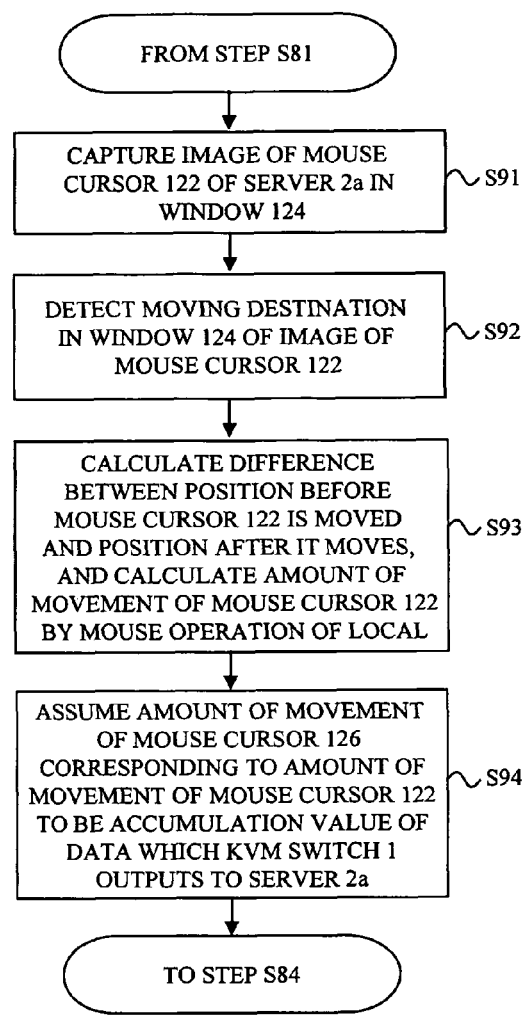
FIG. 14B is a flowchart showing a variation of FIG. 14A.

On behalf of steps S82 and S83, a process in FIG. 14B may be executed. In this case, the CPU 31 of the PC 11a can execute all the procedures.

In FIG. 14B, after the procedure of step S81, the CPU 31 of the PC 11a captures the image of the mouse cursor 122 of the server 2a in the window 124, as described in the first embodiment (step S91), detects a moving destination in the window 124 of the image of the mouse cursor 122 of the server 2a by pattern matching (step S92). The CPU 31 of the PC 11a calculates a difference between the position before the mouse cursor 122 of the server 2a is moved (i.e., the position of the mouse cursor 122 when the mouse operation is changed from the remote to the local) and the position after it moves (i.e., the position of the mouse cursor 122 when the mouse operation is changed from the local to the remote), and calculates the amount of movement of the mouse cursor 122 of the server 2a by the mouse operation of the local (Step S93).

Then, the CPU 31 of the PC 11a assumes the amount of movement of the mouse cursor 126 of the PC 11a corresponding to the calculated amount of movement of the mouse cursor 122 of the server 2a to be the accumulation value of the data which the KVM switch 1 outputs to the server 2a, by using the table data in FIG. 7B (step S94). The procedure proceeds to step S84.

Next, a description will now be given of an example in which the controller 101 of the KVM switch 1 executes the process in FIG. 14A.

Figure 15:
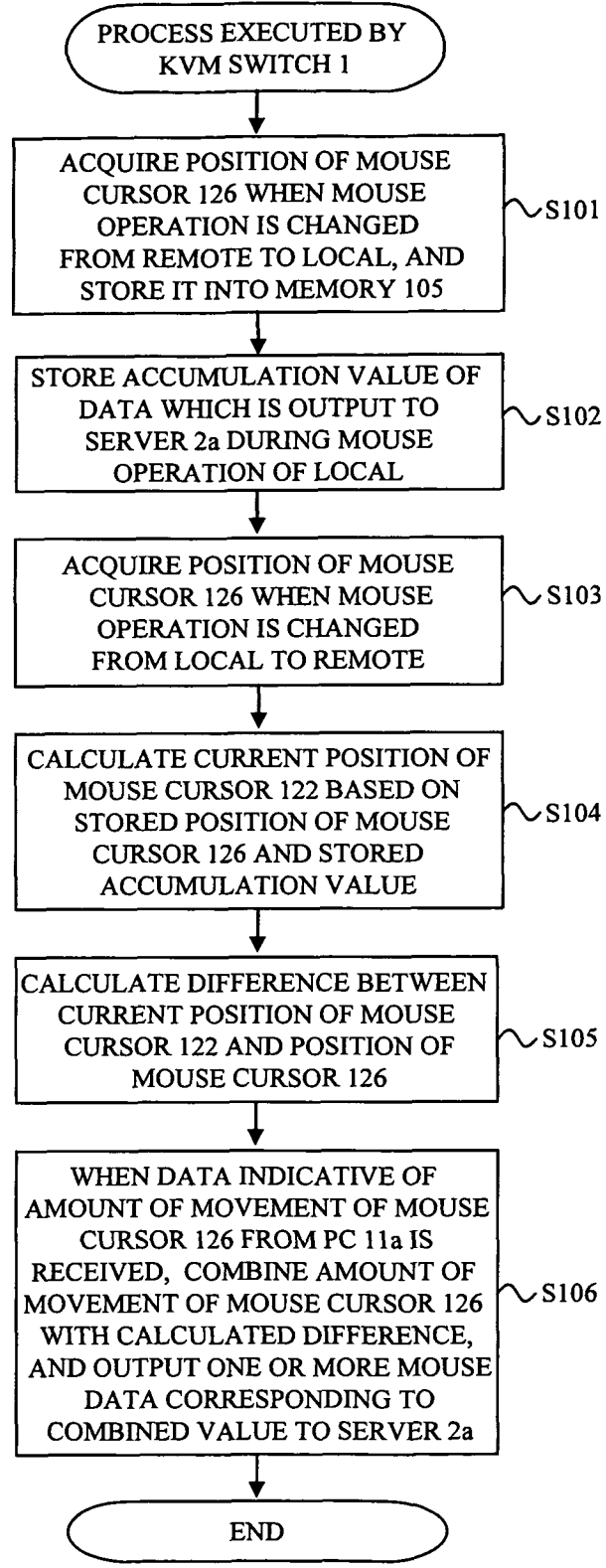
FIG. 15 is a flowchart showing a process executed by the KVM switch 1.

FIG. 15 is a flowchart showing the process executed by the KVM switch 1.

First, the controller 101 of the KVM switch 1 acquires the position of the mouse cursor 126 of the PC 11a when the mouse operation is changed from the remote (the side of the PC 11a) to the local (the side of the server 2a and the KVM switch 1), i.e., the final position of the mouse operation of the remote, from the PC 11a, and stores it into the memory 105 (step S101).

Next, the controller 101 of the KVM switch 1 stores an accumulation value of data which is output to the server 2a during the mouse operation of the local into the memory 105 (step S102).

Next, the controller 101 of the KVM switch 1 acquires the position of the mouse cursor 126 of the PC 11a when the mouse operation is changed from the local to the remote from the PC 11a (step S103). The controller 101 of the KVM switch 1 calculates the current position of the mouse cursor 122 of the server 2a based on the final position of the mouse operation of the remote stored into the memory 105 and the accumulation value of data which is output to the server 2a (step S104), and calculates a difference between the current position of the mouse cursor 122 of the server 2a and the position of the mouse cursor 126 of the PC 11a acquired in step S103 (step S105).

Then, when the controller 101 of the KVM switch 1 receives data indicative of the amount of movement of the mouse cursor 126 of the PC 11a from the PC 11a, the controller 101 of the KVM switch 1 combines the amount of movement of the mouse cursor 126 of the PC 11a with the difference calculated in step S105, and outputs one or more mouse data corresponding to the combined value to the server 2a by using the table data in FIG. 7C (step S106). Specifically, the controller 101 of the KVM switch 1 calculates the amount Y of movement of the mouse cursor 126 of the PC 11a which coincides with the combined value, and outputs one or more mouse data corresponding to the amount Y of movement to the server 2a.

According to the above-mentioned process, when the mouse operation is changed from the local to the remote, the position of the mouse cursor 122 of the server 2a coincides with the position of the mouse cursor 126 of the PC 11a.

According to the process in FIG. 14a, 14B, or 15, even when the mouse cursor 122 of the server 2a is alternately operated by the local or the remote, the position gap between the mouse cursor 126 of the PC 11a and the mouse cursor 122 of the server 2a can be corrected, and hence it is possible to provide a comfortable mouse operating environment for the operator of the mouse 14a.

In the present embodiment, it is assumed that an additional process is executed when a mouse operation is executed in the server and the PC 11a. However, as in the prior art, in the KVM system which invalidates the additional process of the server 2a and the PC 11a, the pieces of mouse data which are input and output to the server 2a, the KVM switch 1, and the PC 11a are the same as each other.

Thus, although the KVM system that invalidates the additional process of the server 2a and the PC 11a can apply the processes in FIGS. 14A, 14B, and 15, it is not necessary to use the pieces of table data in FIGS. 7B and 7C. In this case, in step S87, the CPU 31 of the PC 11a combines the amount of movement of the mouse cursor 126 of the PC 11a with the difference calculated in step S85, and outputs data of the combined value to the server 2a. In step 94, the calculated amount of movement of the mouse cursor 122 of the server 2a becomes the accumulation value of the data which the KVM switch 1 outputs to the server 2. Further, in step S106, the controller 101 of the KVM switch 1 combines the amount of movement of the mouse cursor 126 of the PC 11a with the difference calculated in step S105, and outputs data of the combined value to the server 2a.

Fourth Embodiment

In the present embodiment, a description will now be given of a position correcting process executed in the case where the mouse cursor 126 of the PC 11a once goes out of the inside of the window 124 to the outside thereof, and goes into the inside of the window 124 from the outside thereof again.

A KVM system according to the present embodiment has the same construction as the KVM system 1000 according to the first embodiment.

Figure 16:
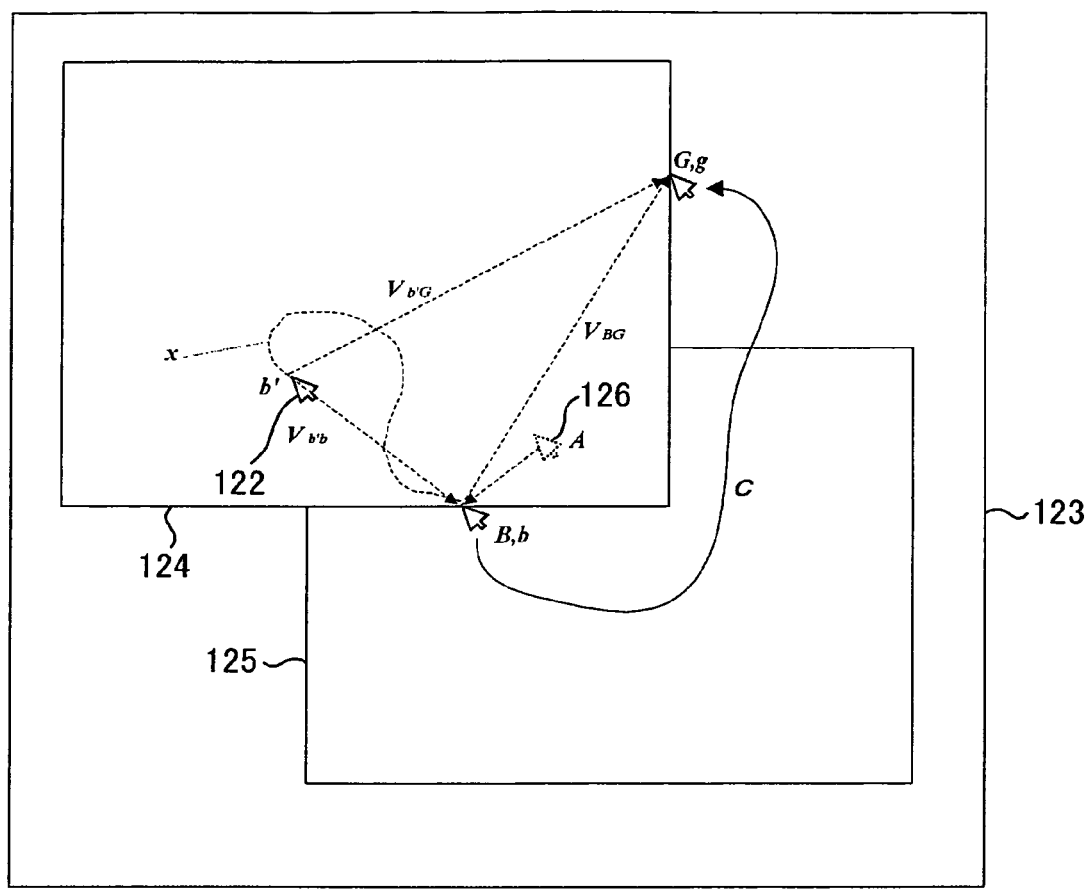
FIG. 16 is a diagram showing the screen of the PC 11a according to a fourth embodiment of the present invention.

FIG. 16 is a diagram showing the screen of the PC 11a according to a fourth embodiment of the present invention.

In FIG. 16, reference numeral 122 denotes a mouse cursor of the server 2a, reference numeral 123 denotes a screen of the PC 11a, and reference numeral 126 denotes a mouse cursor of the PC 11a. Reference numeral 124 denotes a window where non-display of the mouse cursor 126 of the PC 11a has been set, and reference numeral 125 denotes another window where display of the mouse cursor has been set. On the window 124, the screen of the local (server 2a) is displayed. The display or non-display of the mouse cursor in the window 124 and the window 125 can be set by an operating system of the PC 11a.

First, it is assumed that the position gap between the mouse cursor 126 of the PC 11a and the mouse cursor 122 of the server 2a does not occur. When the mouse cursor 126 of the PC 11a moves from the position "A" to the position "B" on the frame of the window 124, the CPU 31 of the PC 11a stores coordinates of the position "B" into the HDD 34. At this time, the mouse cursor 122 of the server 2a is at the position "b" which is the same position as the position "B".

Then, by the mouse operation of the operator of the PC 11a, the mouse cursor 126 of the PC 11a traces any trace "C" outside the window 124, and reaches a position "G" on the frame of the window 124. At this time, a difference between the coordinates of the position "B" and the coordinates of the position "G" becomes "$V_{BG}$".

At the instant when the mouse cursor 126 of the PC 11a reaches the position "G" on the frame of the window 124, the CPU 31 of the PC 11a calculates the difference "$V_{BG}$" between the coordinates of the position "B" and the coordinates of the position "G" stored into the HDD 34, and outputs the calculated difference to server 2a. As a result, the mouse cursor 122 of the server 2a moves from the position "b" to the position "g". It should be noted that the position "g" is the same position as the position "G".

When the mouse cursor 122 of the server 2a traces a track x by the mouse operation of the local and moves from the position "b" to the position "b'" while the mouse cursor 126 of the PC 11a is tracing any route C outside the window 124, the CPU 31 of the PC 11a calculates a difference "$V_{b'b}$" between the coordinates of the position "b" and the coordinates of the position "b'" in advance, and stores the difference into the HDD 34.

Then, At the instant when the mouse cursor 126 of the PC 11a reaches the position "G" on the frame of the window 124, the CPU 31 of the PC 11a combines the difference "$V_{b'b}$" stored into the HDD 34 with the difference "$V_{BG}$", and outputs the combined value "$V_{b'G}$" to the server 2a. As a result, the mouse cursor 122 of the server 2a moves from the position "b'" to the position "g".

After the mouse cursor 126 of the PC 11a enters the inside of the window 124 from the position "G", the processes described in the first to third embodiments are executed, and hence the position gap between the mouse cursor 126 of the PC 11a and the mouse cursor 122 of the server 2a does not occur.

Figure 17:
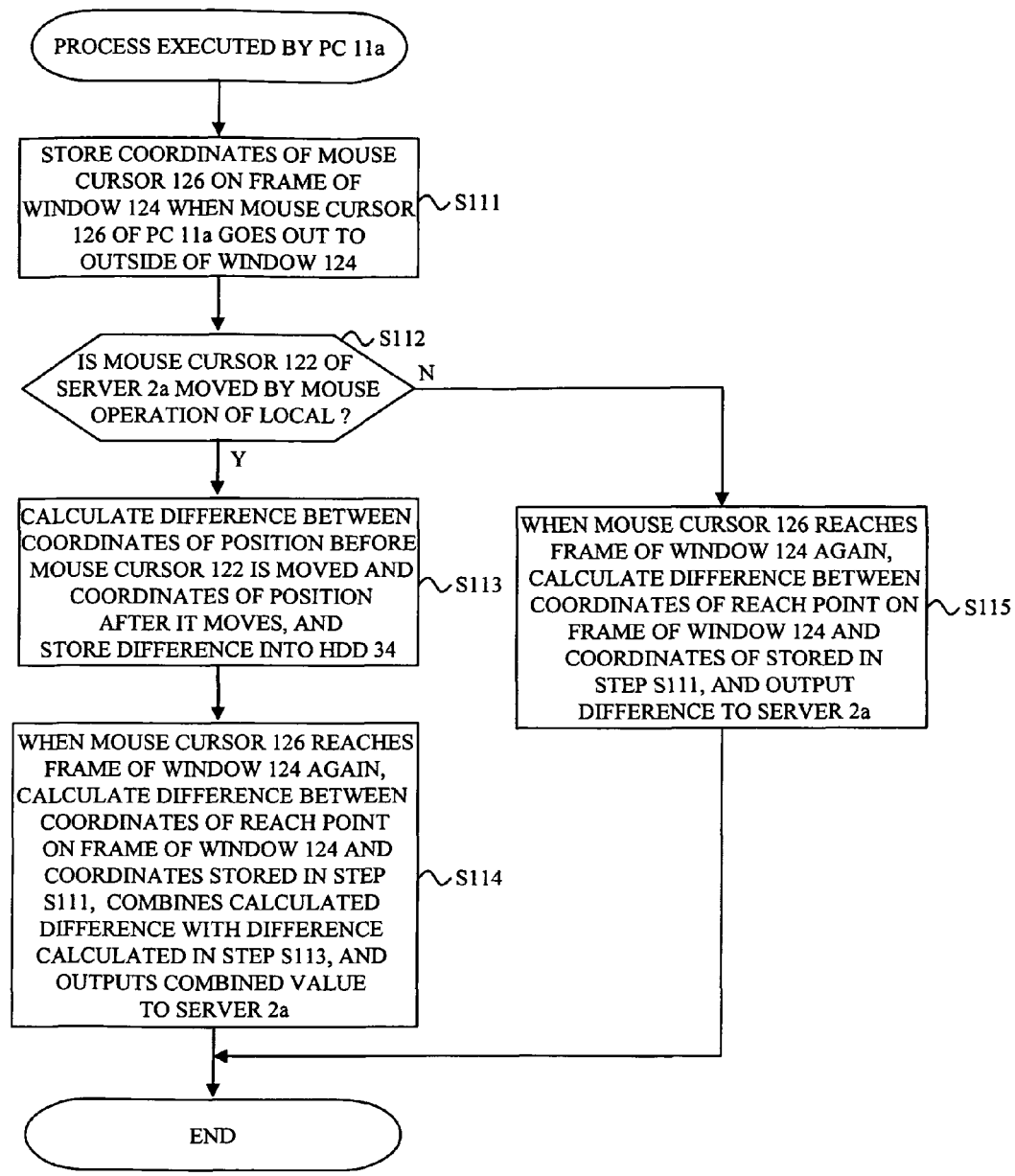

FIG. 17 is a flowchart showing a process executed by the CPU 31 of the PC 11a.

First, the CPU 31 of the PC 11a stores coordinates of the mouse cursor 126 on the frame of the window 124 when the mouse cursor 126 of the PC 11a goes out to the outside of the window 124 into the HDD 34 (step S111). Next, the CPU 31 of the PC 11a determines whether the mouse cursor 122 of the server 2a is moved by the mouse operation of the local (step S112).

When the answer to the determination of step S112 is "YES", the CPU 31 of the PC 11a calculates a difference between coordinates of the position before the mouse cursor 122 of the server 2a is moved and coordinates of the position after it moves, and stores the difference into the HDD 34 (step S13).

Next, when the mouse cursor 126 of the PC 11a reaches the frame of the window 124 again, the CPU 31 of the PC 11a calculates a difference between coordinates of the mouse cursor 126 on the frame of the window 124 and the coordinates of the mouse cursor 126 stored into the HDD 34 in step S111, combines the calculated difference with the difference of movement of the mouse cursor 122 of the server 2a stored into the HDD 34 in step S113, and outputs the combined value to the server 2a (step S114). The present process is terminated.

When the answer to the determination of step S112 is "NO", in the case where the mouse cursor 126 of the PC 11a reaches the frame of the window 124 again, the CPU 31 of the PC 11a calculates a difference between coordinates of the mouse cursor 126 on the frame of the window 124 and the coordinates of the mouse cursor 126 stored into the HDD 34 in step S111, and outputs the difference to the server 2a (step S115). The present process is terminated.

Figure 18:
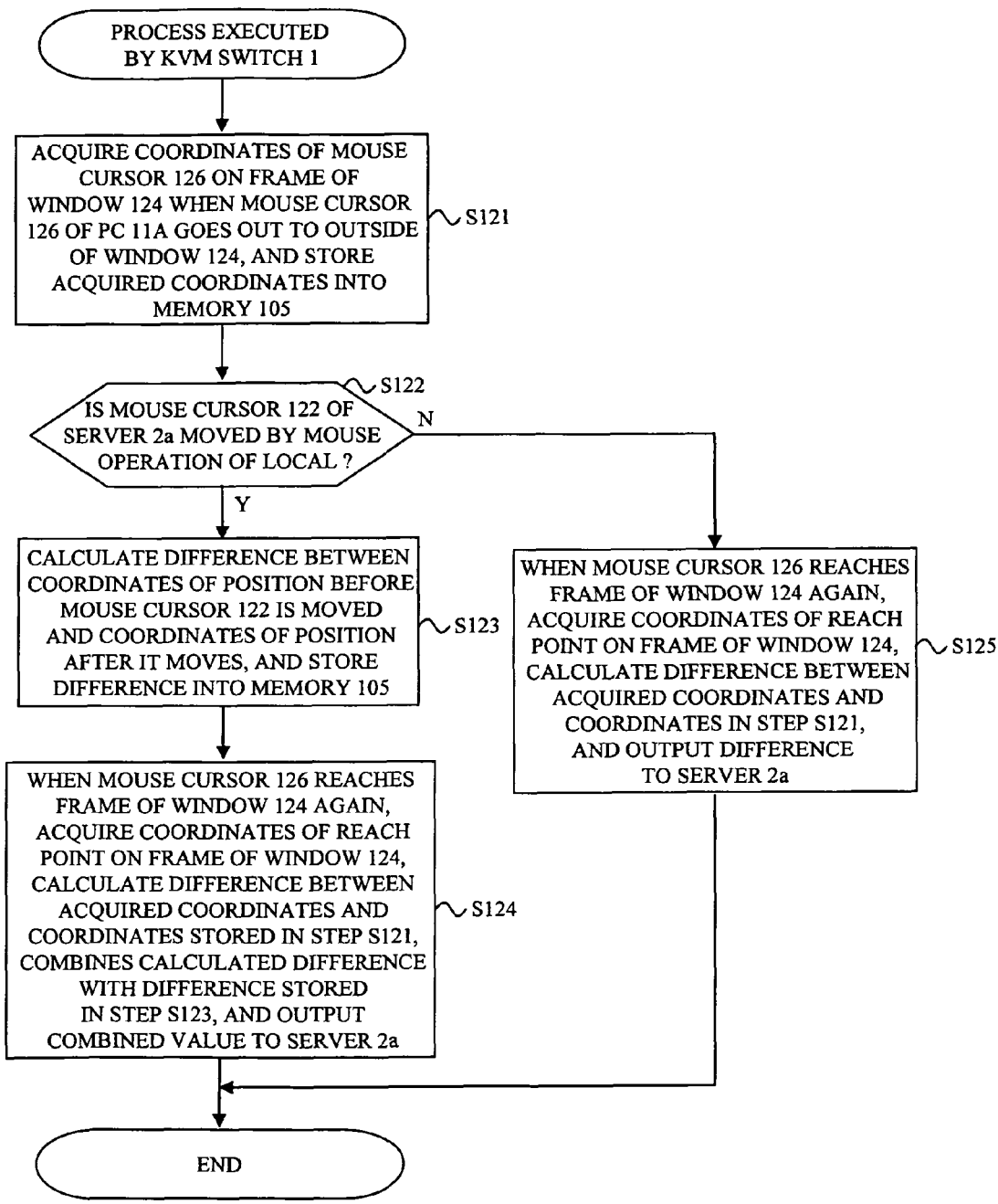
FIG. 18 is a flowchart showing a process executed by a controller 101 of the KVM switch 1.
Figure 19:
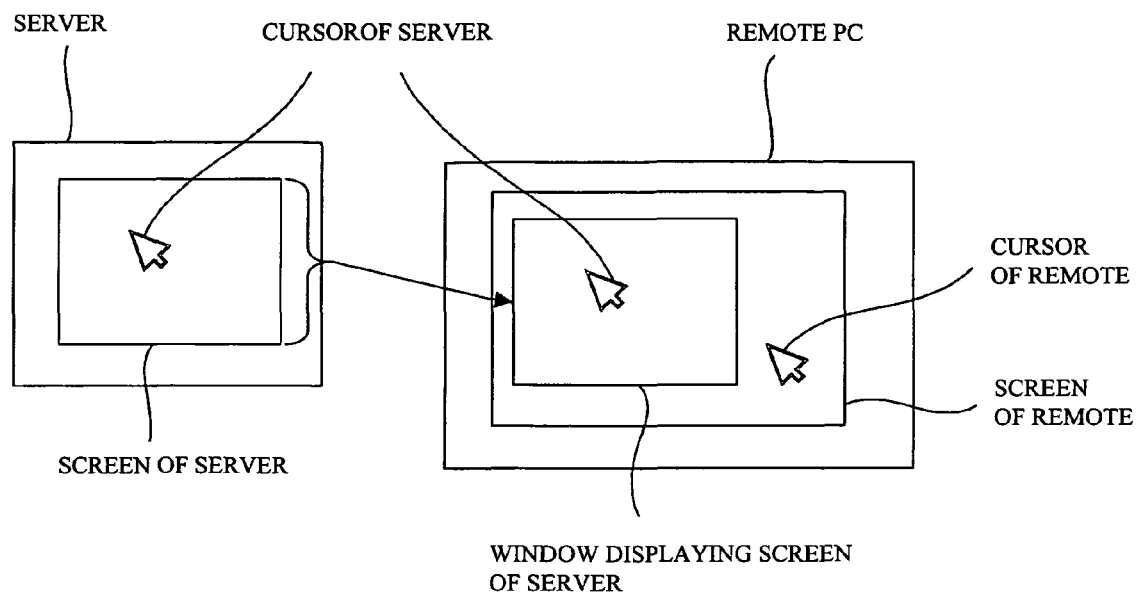
FIG. 19 is a diagram showing a conventional relationship between the screen of a server and the screen of a remote PC.

FIG. 18 is a flowchart showing a process executed by the controller 101 of the KVM switch 1.

First, the controller 101 of the KVM switch 1 acquires the coordinates of the mouse cursor 126 on the frame of the window 124 when the mouse cursor 126 of the PC 11a goes out to the outside of the window 124, from the PC 11a, and stores the acquired coordinates into the memory 105 (step S121). Next, the controller 101 of the KVM switch 1 determines whether the mouse cursor 122 of the server 2a is moved by the mouse operation of the local (step S122).

When the answer to the determination of step S122 is "YES", the controller 101 of the KVM switch 1 calculates a difference between coordinates of the position before the mouse cursor 122 of the server 2a is moved and coordinates of the position after it moves, and stores the difference into the memory 105 (step S123).

Next, when the mouse cursor 126 of the PC 11a reaches the frame of the window 124 again, the controller 101 of the KVM switch 1 acquires coordinates of the mouse cursor 126 on the frame of the window 124, calculates a difference between the acquired coordinates and the coordinates stored into the memory 105 in step S121, combines the calculated difference with the difference of movement of the mouse cursor 122 of the server 2a stored into the memory 105 in step S123, and outputs the combined value to the server 2a (step S124). The present process is terminated.

On the other hand, when the answer to the determination of step S122 is "NO", in the case where the mouse cursor 126 of the PC 11a reaches the frame of the window 124 again, the controller 101 of the KVM switch 1 acquires the coordinates of the mouse cursor 126 on the frame of the window 124 from the PC 11a, calculates a difference between the acquired coordinates and the coordinates of the mouse cursor 126 stored into the memory 105 in step S121, and outputs the difference to the server 2a (step S125). The present process is terminated.

According to the process in FIG. 17 or FIG. 18, when the mouse cursor 126 of the PC 11a once goes out of the inside of the window 124 to the outside thereof, and goes into the inside of the window 124 from the outside thereof again, the position gap between the mouse cursor 126 of the PC 11a and the mouse cursor 122 of the server 2a can be automatically corrected, and hence it is possible to provide a comfortable mouse operating environment for the operator of the mouse 14a.

In the present embodiment, one window on which the mouse cursor of the server is displayed is displayed on the screen 123 of the PC 11a (see window 124). For example, when a plurality of windows on which the mouse cursors of the servers are displayed is displayed on the screen 123 of the PC 11a (i.e., when the plurality of windows for the servers are displayed), the process in FIG. 17 or FIG. 18 is executed for each of the windows.

In the prior art, every time the mouse cursor of the remote PC has gone out of the frame of the window on which the mouse cursor of the server is displayed, and has moved into another window, the operator of the remote PC manually has set the position gab correcting function to ON, so that the position gap between the mouse cursor of the remote PC and the mouse cursor of the server has been corrected. Therefore, the operator of the remote PC has felt troublesome.

In such a case, by executing the above process in FIG. 17 or FIG. 18, the position gap between the mouse cursor of the remote PC and the mouse cursor of the server is automatically corrected. As a result, the operator of the remote PC never feels troublesome, and it is possible to provide a comfortable mouse operating environment.

In the first to fourth embodiments, the mouse 14a is used for operating the mouse cursor 126 of the PC 11a, and the mouse 14a or the mouse 5 is used for operating the mouse cursor 122 of the server 2a. However, the operating member for operating the mouse cursor 126 of the PC 11a or the mouse cursor 122 of the server 2a is not limited to the mouse, and may be an operating member having a function which moves the mouse cursor, such as a tablet.

A recording medium having the software program for realizing the functions of each server recorded thereon may be provided to each server, and the CPU of each server may read and execute the program recorded on the recording medium. In this manner, the same effects as those of the above described first to fourth embodiments can also be achieved. Similarly, a recording medium having the software program for realizing the functions of each remote terminal recorded thereon may be provided to each remote terminal, and the CPU of each remote terminal may read and execute the program recorded on the recording medium. In this manner, the same effects as those of the above described first to fourth embodiments can also be achieved. Further, A recording medium having the software program for realizing the functions of the KVM switch 1 recorded thereon may be provided to the KVM switch 1, and the controller 101 of the KVM switch 1 may read and execute the program recorded on the recording medium. In this manner, the same effects as those of the above described first to fourth embodiments can also be achieved. In this case, the KVM switch 1 has a device (e.g. CD-ROM drive, DVD-ROM drive, or the like) which reads out the program from the recording medium. The recording medium for supplying the program may be a CD-ROM, a DVD, a SD card, or the like.

Also, the CPU of each server may execute the software program for realizing the functions of each PC. In this manner, the same effects as those of the above described first to fourth embodiments can also be achieved. Similarly, the CPU of each remote terminal may execute the software program for realizing the functions of each remote terminal. In this manner, the same effects as those of the above described first to fourth embodiments can also be achieved. Further, the controller 101 of the KVM switch 1 may execute the software program (e.g. driver software) for realizing the functions of the KVM switch 1. In this manner, the same effects as those of the above described first to fourth embodiments can also be achieved.

It should be understood that the present invention is not limited to the above described embodiments, and various modifications may be made to them without departing from the scope of the invention.

The Present application is based on Japanese Patent Application No. 2007-222925 filed Aug. 29, 2007, the entire disclosure of which is hereby incorporated by reference.

What is claimed is:

1. An information processing apparatus, comprising:
an inputting portion that accepts operation data input from an operating member;
a display that displays a cursor of the information processing apparatus that moves according to the operation data input, and a window onto which a screen image of a server including a cursor of the server that moves according to operation data output to the server and to the movement of the cursor of the information processing apparatus is displayed;

a controller that determines a relationship between the operation data input, an amount of movement of a cursor of the information processing apparatus displayed that moves in accordance with the operation data input, and an amount of movement of a cursor of the server that moves in accordance with the movement of the cursor of the information processing apparatus moved, and determines corresponding operation data that makes an amount of movement of a cursor of a server coincide with an amount of movement of a cursor of the information processing apparatus based on the determined relationship;

an outputting portion that outputs the determined corresponding operation data to the server;

a first calculating portion that calculates the amount of movement of the cursor of the information processing apparatus;

a position detecting portion that detects a position of the cursor of the server displayed on the window;

a second calculating portion that calculates the amount of movement of the cursor of the server, based on a position of the cursor of the server before and after the cursor is moved as detected by the position detecting portion;

a first generating portion that generates first table data indicative of a corresponding relationship between the operation data input by the inputting portion, the amount of movement of the cursor of the information processing apparatus calculated by the first calculating portion, and the amount of movement of the cursor of the server calculated by the second calculating portion;

an extracting portion that extracts an image of the cursor of the server displayed on the window;

wherein the position detecting portion detects a position of the extracted image corresponding to the cursor of the server displayed on the window; and the second calculating portion calculates the amount of movement of the cursor of the server based on the position of the extracted image detected by the position detecting portion, wherein when determining the relationship, the controller:

controls the movement of the cursor of the information processing apparatus upon the operation data input from the inputting portion;

outputs data related to an amount of movement of the cursor of the information processing apparatus to the server; and determines a position of the cursor of the server moved according to the output data.

2. The information processing apparatus as claimed in claim 1, comprising:

a second generating portion that generates second table data indicative of a corresponding relationship between the amount of movement of the cursor of the information processing apparatus calculated by the first calculating portion, the amount of movement of the cursor of the server calculated by the second calculating portion, and the determined corresponding operation data, based on the first table data.

3. The information processing apparatus as claimed in claim 1, wherein the controller includes:

a third calculating portion that calculates the amount of movement of the cursor of the information processing apparatus, a coordinate detecting portion that detects coordinates of the cursor of the server displayed on the window, a fourth calculating portion that calculates the amount of movement of the cursor of the server based on previously detected coordinates and current coordinates detected by the coordinate detecting portion, and a third generating portion that generates first table data indicative of a corresponding relationship between the operation data input by the inputting portion, the amount of movement of the cursor of the information processing apparatus calculated by the third calculating portion, and the amount of movement of the cursor of the server calculated by the fourth calculating portion.

4. The information processing apparatus as claimed in claim 3, comprising:

a fourth generating portion that generates second table data indicative of a corresponding relationship between the amount of movement of the cursor of the information processing apparatus calculated by the third calculating portion, the amount of movement of the cursor of the server calculated by the fourth calculating portion, and the determined corresponding operation data, based on the first table data.

5. The information processing apparatus as claimed in claim 1, comprising:

a limiting portion that limits a moving range of the cursor of the information processing apparatus within the window displayed, and on which the cursor of the server is displayed.

6. The information processing apparatus as claimed in claim 1, when determining the corresponding operation data, the controller:

determines an amount of movement of the cursor of the information processing apparatus upon input of the operation data; and determines an amount of movement of the cursor of the server upon input of the operation data;

determines relationship between the amount of movement of the cursor of the server and the operation data; and determines operation data that makes an amount of movement of the cursor of the server coincide with an amount of movement of the cursor of the information processing apparatus moved upon input operation data.

7. An information processing apparatus with which a second operating member and a display are connected, and connected with a server via a keyboard video mouse (KVM) switch with which a first operating member is connected, the display displaying a cursor of the information processing apparatus which moves by operation of the second operating member and a cursor of the server which moves by operation of any one of the first operating member and the second operating member, comprising:

an outputting portion that outputs operation data from the second operating member to the server through the KVM switch;

a storing portion that stores a position of the cursor of the information processing apparatus at a point when the operation is changed from the second operating member to the first operating member;

an acquiring portion that acquires an accumulation value of operation data from the first operating member which is output from the KVM switch to the server during the operation of the first operating member;

a controlling portion that, when the operation is changed from the first operating member to the second operating member, calculates a current position of the cursor of the server at a time the operation is changed based on the stored position of the cursor of the information processing apparatus and the acquired accumulation value, calculates a difference between the calculated current position of the cursor of the server and the current position of the cursor of the information processing apparatus, and outputs the calculated difference and an amount of movement of the cursor of the information processing apparatus by the operation of the second operating member to the server;

wherein the storing portion includes table data indicative of a corresponding relationship between an amount of movement of the cursor of the information processing apparatus, an amount of movement of the cursor of the server, and operation data that makes the amount of movement of the cursor of the server coincide with the amount of movement of the information processing apparatus, the operation data being output from the second operating member, and the controlling portion outputs the operation data corresponding to the calculated difference and an amount of movement of the cursor of the information processing apparatus, based on the table data;

wherein the accumulation value of operation data which is output from the KVM switch to the server is a calculation value calculated by extracting an image of the cursor of the server displayed, detecting a position of the cursor of the server after the extracted image of the cursor of the server is moved by the operation of the first operating member, and calculating an amount of movement of the cursor of the server based on a detected position of the extracted image before the cursor is moved and a detected position of the extracted image after the cursor is moved.

8. An information processing apparatus that is connected with a server via a keyboard video mouse (KVM) switch, and that is connected with an operating member and a display for displaying a window that includes an image of a cursor of the server which moves by operation of the operating member and for displaying a cursor of the information processing apparatus which moves by operation of the operating member, the information processing apparatus comprising:

a storing portion that stores coordinates on a boundary of the window which the cursor of the information processing apparatus moving to the outside of the window has passed based on the operation of the operating member, and on which a position of the cursor of the server and a position of the cursor of the information processing apparatus coincide with each other; and a controlling portion that, when the cursor of the information processing apparatus reaches the window from the outside of the window, calculates a difference between coordinates on the boundary of the window which the cursor reaches and the stored coordinates, and outputs the calculated difference to the server;

wherein when the cursor of the server is moved by the operation of a KVM operating member connected with the KVM switch while the cursor of the information processing apparatus is moving to the outside of the window, the controlling portion calculates a first difference between coordinates of the cursor of the server before and after the cursor of the server is moved, and causes the storing portion to store the first difference, and when the cursor of the information processing apparatus reaches the window from the outside of the window, the controlling portion calculates a second difference between coordinates indicative of the boundary of the window which the cursor reaches and the stored coordinates, and outputs the second difference with the stored first difference to the server.

9. A keyboard video mouse (KVM) switch that is connected between a server and an information processing apparatus to which an operating member and a display for displaying a window onto a screen image of the server is displayed are connected, the KVM switch comprising:

an inputting portion that accepts operation data input from the operating member;

a display that displays a cursor of the information processing apparatus that moves according to the operation data, and a window onto which a screen image of the server including a cursor of the server that moves according to operation data output to the server and to the movement of the cursor of the information processing apparatus is displayed;

a controller that determines a relationship between the input operation data, an amount of movement of a cursor of the information processing apparatus displayed that moves in accordance with the input operation data, and an amount of movement of a cursor of the server that moves in accordance with the movement of the cursor of the information processing apparatus moved, and determines operation data that makes an amount of movement of a cursor of a server coincide with an amount of movement of a cursor of the information processing apparatus based on the determined relationship;

an outputting portion that outputs the determined operation data to the server;

a first calculating portion that calculates the amount of movement of the cursor of the information processing apparatus;

a position detecting portion that detects a position of the cursor of the server displayed on the window;

a second calculating portion that calculates the amount of movement of the cursor of the server, based on a position of the cursor of the server before the cursor of the server is moved as detected by the position detecting portion;

a first generating portion that generates first table data indicative of a corresponding relationship between the operation data, the amount of movement of the cursor of the information processing apparatus calculated by the first calculating portion, and the amount of movement of the cursor of the server calculated by the second calculating portion; and an extracting portion that extracts an image of the cursor of the server displayed on the window;

wherein the position detecting portion detects a position of the extracted image corresponding to the cursor of the server displayed on the window; and the second calculating portion calculates the amount of movement of the cursor of the server based on the position of the extracted image detected by the position detecting portion, wherein when determining the relationship, the controller:

controls the movement of the cursor of the information processing apparatus upon an input of the operation data from the inputting portion;

outputs data related to an amount of movement of the cursor of the information processing apparatus to the server; and determines a position of the cursor of the server moved according to the output data.

10. The KVM switch as claimed in claim 9, comprising:

a second generating portion that generates second table data indicative of a corresponding relationship between the amount of movement of the cursor of the information processing apparatus calculated by the first calculating portion, the amount of movement of the cursor of the server calculated by the second calculating portion, and the determined operation data, based on the first table data.

11. The KVM switch as claimed in claim 9,
wherein the controller includes:
a third calculating portion that calculates the amount of movement of the cursor of the information processing apparatus,
a coordinate detecting portion that detects coordinates of the cursor of the server displayed on the window,
a fourth calculating portion that calculates the amount of movement of the cursor of the server based on previously detected coordinates and current coordinates detected by the coordinate detecting portion, and
a third generating portion that generates first table data indicative of a corresponding relationship between the operation data input by the inputting portion the amount of movement of the cursor of the information processing apparatus calculated by the third calculating portion, and the amount of movement of the cursor of the server calculated by the fourth calculating portion.

12. The KVM switch as claimed in claim 11, comprising:
a fourth generating portion that generates second table data indicative of a corresponding relationship between the amount of movement of the cursor of the information processing apparatus calculated by the third calculating portion, the amount of movement of the cursor of the server calculated by the fourth calculating portion and the determined operation data, based on the first table data.

13. The KVM switch as claimed in claim 9, comprising:
a limiting portion that limits a moving range of the cursor of the information processing apparatus in the window displayed, and on which the cursor of the server is displayed.

14. A keyboard video mouse (KVM) switch, to which a first operating member is connected, that is connectable to an information processing apparatus and a server, the information processing apparatus being connected with a second operating member and a display that displays a cursor of the information processing apparatus which moves by operation of the second operating member and a cursor of the server which moves by operation of any one of the first operating member and the second operating member, the KVM switch comprising:
an outputting portion that outputs operation data from the second operating member to the server;
a storing portion that acquires a position of the cursor of the information processing apparatus at a point when the operation is changed from the second operating member to the first operating member from the information processing apparatus and stores the position, and stores an accumulation value of operation data from the first operating member which is output from the KVM switch to the server during the operation of the first operating member; and
a controlling portion that acquires a position of the cursor of the information processing apparatus when the operation is changed from the first operating member to the second operating member from the information processing apparatus, calculates a current position of the cursor of the server at a time the operation changed based on the stored position of the cursor of the information processing apparatus and the stored accumulation value, calculates a difference between the calculated current position of the cursor of the server and the position of the cursor of the information processing apparatus when the operation is changed from the first operating member to the second operating member, and outputs the calculated difference and an amount of movement of the cursor of the information processing apparatus by the operation of second operating member to the server;
wherein the storing portion includes table data indicative of a corresponding relationship between an amount of movement of the cursor of the information processing apparatus, an amount of movement of the cursor of the server, and operation data that makes the amount of movement of the cursor of the server coincide with the amount of movement of the information processing apparatus, the operation data being output from the second operating member, and
the controlling portion outputs the operation data corresponding to the calculated difference and an amount of movement of the cursor of the information processing apparatus, based on the table data.

15. A keyboard video mouse (KVM) switch that is connectable to an information processing apparatus and a server, the information processing apparatus being connected with an operating member and a display for displaying a window that includes an image of a cursor of the server which moves by operation of the operating member and that displays a cursor of the information processing apparatus which moves by operation of the operating member, the KVM switch comprising:
a storing portion that acquires from the information processing apparatus coordinates on a boundary of the window which the cursor of the information processing apparatus moving to the outside of the window has passed based on the operation of the operating member, and on which a position of the cursor of the server and a position of the cursor of the information processing apparatus coincide with each other, and stores the coordinates; and
a controlling portion that, when the cursor of the information processing apparatus reaches the window from the outside of the window, acquires coordinates on the boundary of the window which the cursor reaches from the information processing apparatus, calculates a difference between the acquired coordinates on the boundary of the window which the cursor reaches and the stored coordinates, and outputs the calculated difference to the server,
wherein when the cursor of the server is moved by the operation of a KVM operating member connected with the KVM switch while the cursor of the information processing apparatus is moving to the outside of the window, the controlling portion calculates a first difference between coordinates of the cursor of the server before and after the cursor of the server is moved, and causes the storing portion to store the first difference, and
when the cursor of the information processing apparatus reaches the window from the outside of the window, the controlling portion acquires coordinates indicative of the boundary of the window from the information processing apparatus, calculates a second difference between the acquired coordinates indicative of the boundary of the window which the cursor reaches and the stored coordinates, and outputs the second difference with the first difference to the server.

16. A server that is connected between an information processing apparatus to which an operating member is connected and a keyboard video mouse (KVM) switch, comprising:

an inputting portion that inputs data indicative of an amount of movement of a cursor of the information processing apparatus;

a deciding portion that decides operation data output from the operating member based on the order of inputting the data indicative of the amount of movement of the cursor of the information processing apparatus;

a controller that determines a relationship between the decided operation data, an amount of movement of a cursor of the information processing apparatus displayed that moves in accordance with the input operation data, and an amount of movement of a cursor of the server that moves in accordance with the movement of the cursor of the information processing apparatus moved, and determines operation data that makes an amount of movement of a cursor of a server coincide with an amount of movement of a cursor of the information processing apparatus based on the determined relationship; and a moving portion that moves the cursor of the server based on the operation data determined by the controller;

wherein the controller includes:

an acquiring portion that executes an acceleration process to the data indicative of the amount of movement of the cursor of the information processing apparatus input by the inputting portion, and a first generating portion that generates first table data indicative of a corresponding relationship between the operation data decided by the deciding portion, the amount of movement of the cursor of the information processing apparatus input by the inputting portion, and the amount of movement of the cursor of the server acquired by the acquiring portion;

a second generating portion that generates second table data indicative of a corresponding relationship between the amount of movement of the cursor of the information processing apparatus input by the inputting portion, the amount of movement of the cursor of the server acquired by the acquiring portion, and the determined operation data, based on the first table data.

17. A non-transitory computer readable medium storing a program causing an information processing apparatus to execute a process, the process comprising:

accepting input operation data from an operating member;

displaying cursor of the information processing apparatus that moves according to the input operation data, and a window onto which a screen image of a cursor of a server that moves according to the input operation data that is output to the server is displayed;

determining a relationship between the input operation data, an amount of movement of a cursor of the information processing apparatus displayed that moves in accordance with the input operation data, and an amount of movement of a cursor of the server that moves in accordance with the movement of the cursor of the information processing apparatus moved, and determining corresponding operation data that makes the amount of movement of a cursor of a server coincide with the amount of movement of a cursor of the information processing apparatus based on the determined relationship;

outputting the determined corresponding operation data to the server;

calculating the amount of movement of the cursor of the information processing apparatus;

detecting a position of the cursor of the server displayed on the window;

calculating the amount of movement of the cursor of the server, based on a position of the cursor of the server before and after the cursor is moved as detected;

generating first table data indicative of a corresponding relationship between the input operation data, the amount of movement of the cursor of the information processing apparatus calculated for the information processing apparatus, and the amount of movement of the cursor of the server calculated;

extracting an image of the cursor of the server displayed on the window; and wherein a position of the extracted image corresponding to the cursor of the server displayed on the window is detected; and the amount of movement of the cursor of the server is calculated based on the position of the extracted image detected, wherein determining the relationship comprises:

controlling the movement of the cursor of the information processing apparatus upon accepting the input of the operation data outputting data related to the amount of movement of the cursor of the information processing apparatus to the server; and determining a position of the cursor of the server moved according to the output data.

18. A non-transitory computer readable medium storing a program causing an information processing apparatus to execute a process, the information processing apparatus with which a second operating member and a display are connected being connected with a server via a keyboard video mouse (KVM) switch with which a first operating member is connected, the display displaying a cursor of the information processing apparatus which moves by operation of the second operating member and a cursor of the server which moves by operation of any one of the first operating member and the second operating member, the process comprising:

outputting operation data from the second operating member to the server through the KVM switch;

storing a position of the cursor of the information processing apparatus into a memory at a point when the operation is changed from the second operating member to the first operating member;

acquiring an accumulation value of operation data from the first operating member which is output from the KVM switch to the server during the operation of the first operating member; and calculating, when the operation is changed from the first operating member to the second operating member, a current position of the cursor of the server at a time the operation changed based on the stored position of the cursor of the information processing apparatus and the acquired accumulation value, calculating a difference between the calculated current position of the cursor of the server and the current position of the cursor of the information processing apparatus, and outputting the calculated difference and an amount of movement of the cursor of the information processing apparatus by the operation of the second operating member to the server, wherein the storing portion includes table data indicative of a corresponding relationship between an amount of movement of the cursor of the information processing apparatus, an amount of movement of the cursor of the server, and operation data that makes the amount of movement of the cursor of the server coincide with the amount of movement of the information processing apparatus, the operation data being output from the second operating member, and the controlling portion outputs the operation data corresponding to the calculated difference and an amount of movement of the cursor of the information processing apparatus, based on the table data;

wherein the accumulation value of operation data which is output from the KVM switch to the server is a calculation value calculated by extracting an image of the cursor of the server displayed, detecting a position of the cursor of the server after the extracted image of the cursor of the server is moved by the operation of the first operating member, and calculating an amount of movement of the cursor of the server based on a detected position of the extracted image before the cursor is moved and a detected position of the extracted image after the cursor is moved.

19. A non-transitory computer readable medium having a program stored therein causing an information processing apparatus to execute a process, the information processing apparatus being connected with a server via a keyboard video mouse (KVM) switch, and being connected with an operating member and a display for displaying a window that includes an image of a cursor of the server which moves by operation of the operating member and for displaying a cursor of the information processing apparatus which moves by operation of the operating member, the process comprising:

storing into a memory coordinates on a boundary of the window which the cursor of the information processing apparatus moving to the outside of the window has passed based on the operation of the operating member, and on which a position of the cursor of the server and a position of the cursor of the information processing apparatus coincide with each other; and controlling including calculating, when the cursor of the information processing apparatus reaches the window from the outside of the window, a difference between coordinates on the boundary of the window which the cursor reaches and the stored coordinates, and outputs the calculated difference to the server, wherein when the cursor of the server is moved by the operation of a KVM operating member connected with the KVM switch while the cursor of the information processing apparatus is moving to the outside of the window, the controlling portion calculates a first difference between coordinates of the cursor of the server before and after the cursor of the server is moved, and causes the storing portion to store the first difference, and when the cursor of the information processing apparatus reaches the window from the outside of the window, the controlling portion calculates a second difference between coordinates indicative of the boundary of the window which the cursor reaches and the stored coordinates, and outputs the second difference with the stored first difference to the server.

20. A non-transitory computer readable medium having a program stored therein causing a keyboard video mouse (KVM) switch to execute a process, the KVM switch being connected between a server and an information processing apparatus to which an operating member and a display for displaying a window onto a screen image of the server is displayed are connected, the process comprising:

accepting operation data input from the operating member;

displaying a cursor of the information processing apparatus that moves according to the operation data, and a window onto which a screen image of the server including a cursor of the server that moves according to operation data output to the server and to the movement of the cursor of the information processing apparatus is displayed;

determining a relationship between the input operation data, an amount of movement of a cursor of the information processing apparatus displayed that moves in accordance with the input operation data, and an amount of movement of a cursor of the server that moves in accordance with the movement of the cursor of the information processing apparatus moved, and determining operation data that makes an amount of movement of a cursor of a server coincide with an amount of movement of a cursor of the information processing apparatus based on the determined relationship; and outputting the determined operation data to the server, calculating the amount of movement of the cursor of the information processing apparatus;

detecting a position of the cursor of the server displayed on the window;

calculating the amount of movement of the cursor of the server, based on a position of the cursor of the server before and after the cursor is moved as detected;

generating first table data indicative of a corresponding relationship between the operation data input, the amount of movement of the cursor of the information processing apparatus calculated for the information processing apparatus, and the amount of movement of the cursor of the server calculated;

extracting an image of the cursor of the server displayed on the window; and wherein a position of the extracted image corresponding to the cursor of the server displayed on the window is detected; and the amount of movement of the cursor of the server is calculated based on the position of the extracted image detected, wherein when determining the relationship, a controller:

controls the movement of the cursor of the information processing apparatus upon an input of the operation data from the inputting;

outputs data related to an amount of movement of the cursor of the information processing apparatus to the server; and determines a position of the cursor of the server moved according to the output data.

21. A non-transitory computer readable medium having a program stored therein causing a keyboard video mouse (KVM) switch to execute a process, the KVM switch, to which a first operating member is connected, being connectable to an information processing apparatus and a server, the information processing apparatus being connected with a second operating member and a display for displaying a cursor of the information processing apparatus which moves by operation of the second operating member and a cursor of the server which moves by operation of any one of the first operating member and the second operating member, the process comprising:

outputting operation data from the second operating member to the server;

acquiring a position of the cursor of the information processing apparatus at a point when the operation is changed from the second operating member to the first operating member from the information processing apparatus, storing the position into a memory, and storing an accumulation value of operation data from the first operating member which is output from the KVM switch to the server into the memory during the operation of the first operating member; and acquiring a position of the cursor of the information processing apparatus when the operation is changed from the first operating member to the second operating member from the information processing apparatus, calculating a current position of the cursor of the server at a time the operation changed based on the stored position of the cursor of the information processing apparatus and the stored accumulation value, calculating a difference between the calculated current position of the cursor of the server and the position of the cursor of the information processing apparatus when the operation is changed from the first operating member to the second operating member, and outputting the calculated difference and an amount of movement of the cursor of the information processing apparatus by the operation of second operating member to the server;

wherein the storing portion includes table data indicative of a corresponding relationship between an amount of movement of the cursor of the information processing apparatus, an amount of movement of the cursor of the server, and operation data that makes the amount of movement of the cursor of the server coincide with the amount of movement of the information processing apparatus, the operation data being output from the second operating member, and the controlling portion outputs the operation data corresponding to the calculated difference and an amount of movement of the cursor of the information processing apparatus, based on the table data.

22. A non-transitory computer readable medium having a program stored therein causing a keyboard video mouse (KVM) switch to execute a process, the KVM switch being connectable to an information processing apparatus and a server, the information processing apparatus being connected with an operating member and a display for displaying a window that includes an image of a cursor of the server which moves by operation of the operating member and for displaying a cursor of the information processing apparatus which moves by operation of the operating member, the process comprising:

acquiring from the information processing apparatus coordinates on a boundary of the window which the cursor of the information processing apparatus moving to the outside of the window has passed based on the operation of the operating member, and on which a position of the cursor of the server and a position of the cursor of the information processing apparatus coincide with each other, and stores the coordinates into a memory; and acquiring, when the cursor of the information processing apparatus reaches the window from the outside of the window, coordinates on the boundary of the window which the cursor reaches from the information processing apparatus, calculating a difference between the acquired coordinates on the boundary of the window which the cursor reaches and the stored coordinates, and outputting the calculated difference to the server, wherein when the cursor of the server is moved by the operation of a KVM operating member connected with the KVM switch while the cursor of the information processing apparatus is moving to the outside of the window, the controlling portion calculates a first difference between coordinates of the cursor of the server before and after the cursor of the server is moved, and causes the storing portion to store the first difference, and when the cursor of the information processing apparatus reaches the window from the outside of the window, the controlling portion acquires coordinates indicative of the boundary of the window from the information processing apparatus, calculates a second difference between the acquired coordinates indicative of the boundary of the window which the cursor reaches and the stored coordinates, and outputs the second difference with the first difference to the server.

23. A non-transitory computer readable medium having a program stored therein causing a server to execute a process, the server being connected between an information processing apparatus to which an operating member is connected and a keyboard video mouse (KVM) switch, the process comprising:

inputting data indicative of an amount of movement of a cursor of the information processing apparatus;

deciding operation data output from the operating member based on the order of inputting the data indicative of the amount of movement of the cursor of the information processing apparatus;

determining a relationship between the decided operation data, an amount of movement of a cursor of the information processing apparatus displayed that moves in accordance with the input operation data, and an amount of movement of a cursor of the server that moves in accordance with the movement of the cursor of the information processing apparatus moved, and determining operation data that makes an amount of movement of a cursor of a server coincide with an amount of movement of a cursor of the information processing apparatus based on the determined relationship; and moving the cursor of the server based on the determined operation data, executing an acceleration process to the data indicative of the amount of movement of the cursor of the information processing apparatus input, and generating a first table data indicative of a corresponding relationship between the operation data decided, the amount of movement of the cursor of the information processing apparatus input and the amount of movement of the cursor of the server;

generating a second table data indicative of a corresponding relationship between the amount of movement of the cursor of the information processing apparatus input by, the amount of movement of the cursor of the server and the determining of the operation data, based on the first table data.

* * * * *